(12) United States Patent
Jennings, III

(10) Patent No.: US 6,430,589 B1
(45) Date of Patent: Aug. 6, 2002

(54) SINGLE PRECISION ARRAY PROCESSOR

(75) Inventor: Earle W. Jennings, III, San Jose, CA (US)

(73) Assignee: Hynix Semiconductor, Inc. (KR)

( * ) Notice: Subject to any disclaimer, the term of this patent is extended or adjusted under 35 U.S.C. 154(b) by 0 days.

(21) Appl. No.: 09/100,448

(22) Filed: Jun. 19, 1998

Related U.S. Application Data
(60) Provisional application No. 60/050,396, filed on Jun. 20, 1997.

(51) Int. Cl.⁷ .............................. G06F 7/52; G06F 7/38
(52) U.S. Cl. ...................................... 708/620; 708/523
(58) Field of Search .................... 708/620, 501, 708/523

(56) References Cited

U.S. PATENT DOCUMENTS

| | | | |
|---|---|---|---|
| 3,621,214 A | 11/1971 | Romney et al. ............. 235/151 |
| 3,833,889 A | 9/1974 | Cray ........................ 340/172.5 |
| 4,128,880 A | 12/1978 | Cray, Jr. ...................... 364/200 |
| 4,589,067 A | 5/1986 | Porter et al. ................. 364/200 |
| 4,590,465 A | 5/1986 | Fuchs ........................ 340/723 |
| 4,644,491 A | * 2/1987 | Ookawa et al. ............. 708/620 |
| 4,646,075 A | 2/1987 | Andrews et al. ............ 340/747 |
| 4,651,274 A | 3/1987 | Omoda et al. ............... 364/200 |
| 4,949,280 A | 8/1990 | Littlefield .................... 364/518 |
| 4,953,107 A | 8/1990 | Hedley et al. ............... 364/522 |
| 4,969,118 A | * 11/1990 | Montoye et al. ............ 708/501 |
| 5,101,365 A | 3/1992 | Westberg et al. ........... 395/158 |
| 5,103,217 A | 4/1992 | Cawley ....................... 395/129 |
| 5,144,576 A | 9/1992 | Briggs et al. ............... 364/754 |
| 5,182,797 A | 1/1993 | Liang et al. ................. 395/160 |
| 5,184,318 A | 2/1993 | Briggs et al. ............... 364/754 |
| 5,410,649 A | 4/1995 | Gove .......................... 395/161 |
| 5,418,973 A | 5/1995 | Ellis et al. .................. 395/800 |
| 5,481,669 A | 1/1996 | Poulton et al. ............. 395/164 |
| 5,522,083 A | 5/1996 | Gove et al. ................. 395/800 |
| 5,544,337 A | 8/1996 | Beard et al. ................ 395/375 |
| 5,579,455 A | 11/1996 | Greene et al. .............. 395/122 |
| 5,590,252 A | 12/1996 | Silverbrook ................ 395/133 |
| 5,594,844 A | 1/1997 | Sakai et al. ................. 395/127 |
| 5,598,574 A | 1/1997 | Yoshinaga et al. .......... 395/800 |
| 5,600,846 A | 2/1997 | Gallup et al. ............... 395/800 |
| 5,630,043 A | 5/1997 | Uhlin ......................... 395/174 |
| 5,659,495 A | 8/1997 | Briggs et al. .......... 364/736.02 |
| 5,734,599 A | * 3/1998 | Lee et al. .................... 708/620 |

OTHER PUBLICATIONS

Eiji Iwata et al. "A 2.2GOPS Video DSP with 2-RISC MIMD, 6-PE SIMD Architecture for Real-Time MPEG2 Video Coding/Decoding", © *1997 IEEE International Solid-State Circuits Conference*, 1997 IEEE, ISBN 0-7803-3721-2, pp. 258-259.

Kazuaki Murakami et al., "Paralled Processing RAM Chip with 256Mb DRAM and Quad Processors", *1997 IEEE International Solid-State Circuits Conference*, pp. 228-229, ISBN 0-7803-3721-2.

(List continued on next page.)

*Primary Examiner*—Tan V. Mai
(74) *Attorney, Agent, or Firm*—Townsend and Townsend and Crew LLP

(57) ABSTRACT

A device for performing single precision floating point arithmetic. The device includes a shared operand generator that receives an operand and outputs a result that is a fixed function of the operand. It also includes an arithmetic circuit comprising a plurality of multiply circuits that calculate partial products of a first and second operand and the result of the shared operand generator. It also includes circuitry to calculate the sum of the partial products and a third operand to produce the arithmetic result.

21 Claims, 11 Drawing Sheets

Shared Operand Interface Diagram

OTHER PUBLICATIONS

Yoshiharu Aimoto et al., "A 7.68GIPS 3.84GB/s 1W Parallel Image–Processing RAM Integrating a 16Mb DRAM and 128 Processors", *1996 IEEE International Solid–State Circuits Conference*, pp. 372–373, ISBN 0.7803–3136–2.

Tonu Shimizu et al., "A Multimedia 32b RISC Microprocessor with 16Mb DRAM", *1996 IEEE International Solid–State Circuits Conference*, pp. 216–217, ISBN 0–7803–3136–2.

Naofumi Takagi et al., "High–Speed VLSI Multiplication Algorithm with a Redundant Binary Addition Tree", 1985 *IEEE Transactions on Computers*, vol. C–34, No. 9, Sep. 1985, pp. 789–796.

David W. Matula "Design of a Highly Parallel IEEE Standard Floating Point Unit: They Cyrix 83D87 Coprocessor", *IEEE Computer Society Press*, 1990, p. 334.

"TMX320C6201 Digital Signal Processor: Product Preview", SPRS051.pdf–Jan., 1997, Texas Instruments, available from the Texas Instruments Web–site at http://www.ti.com.

*Product Description: The MIPS16 Application Specific Extension*, vol. 1, found through the Silicon Graphic Incorporated website on Jul. 1997, http://www.sgi.com/MIPS/mips16.pdf.

Yong Yao, "Chromatic's Mpack 2 Boosts 3D: Mpact/3000 Becomes First Media Processor to Ship in Volume", Microprocessor Report, vol. 10, No. 15, Nov. 1996.

Peter N. Glaskowsky, "Fujitsu Aims Media Processor at DVD", Microprocessor report, Nov. 1996, pp. 11–13.

Yong Yao, "Samsung Launches Media Processor: MSP Is Designed for Microsoft's New 3D–Software Architecture", Microprocessor report, vol. 10, No. 11, Aug. 1996.

"Chromatic rolls out Mpact", *The John Peddie Associates PC Graphics Report*, Aug. 27, 1996, John Peddie Associates, Tiburon, CA 94920, pp. 1182–1183.

"Samsung announces Multimedia Signal Processor", *The John Peddie Associates PC Graphics Report*, Aug. 1996, © 1996, John Peddie Associates, Tiburon, CA 94920, pp. 1153–1156.

Papaichalis et al., "Implementation of Fast Fourier Transform Algorithms with the TMS32020", *Digital signal Processing Applications with the TMS320 Family*, © 1986 Texas Instruments, Incorporated, pp. 84–85.

Hiroyasu Ohtomo et al., "A 32–bit Floating Point Digital Signal Processor for Graphics Application", *NEC Research and Development*, No. 99, 1990, pp. 47–52.

\* cited by examiner

Shared Operand Interface Diagram

Single Precision Multiplier Block Diagram

Single Precision Multiplier Adder Tree

Most Significant Zero Detector

Output Format Converter 40 Diagram

SINGLE PRECISION ARRAY PROCESSOR

STATEMENT OF RELATED APPLICATIONS

This patent application claims priority from U.S. Provisional Application No. 60/050,396, filed Jun. 20, 1997, the contents of which are incorporated herein by reference in their entirety for all purposes.

BACKGROUND OF THE INVENTION

The present invention relates to integrated circuits and in particular, to integrated circuits with circuitry for performing single precision floating point arithmetic.

Calculates involving single precision floating point arithmetic arise in many different applications. Often, these are computation intensive applications that benefit greatly from high performance calculations. The applications include, for example, video frame generation and digital signal processing (DSP) tasks.

Many different programs are used in frame generation. For example, see references [19]–[23]. These programs are both complex and need high performance. They are created with high level procedural and object-oriented computer programming languages such as C, C++, and FORTRAN. Only the most performance critical portions of these programs are usually directly written in assembly/machine language targeting the underlying rendering engine hardware because of the prohibitive expense and difficulty of programming in assembly/machine language. Floating point arithmetic is popular in these programs because of its wide dynamic range and programming ease.

The need for performance improvements is large. For example, optimal video editing requires a frame to be generated every second. Real-time virtual reality needs up to 30 frames generated per second. In order to satisfy these needs, and other similar needs in other applications, current technology must improve tremendously. For example, performance improvements needed to satisfy these two industrial applications are speedups of 108,000× for video editing (=30 hrs./frame×3600 seconds/hr) and 3,240,000× for virtual reality (=30*Video Editing).

A similar situation exists in high performance Digital Signal Processing. A typical DSP application includes processing images, often collected from 2-D and 3-D sensor arrays over time to construct images of the interior of materials including the human body and machine tools. These multidimensional signal processing applications construct images from banks of ultra-sound or magnetic imaging sensors. This has similar performance requirements to frame generation. These applications have the goal of resolving features in a reconstruction/simulation of a 3-D or 4-D environment. (Note: 4-D here means a 3-D domain observed/simulated over time.) Feature resolution is a function of input sensor resolution, depth of FFT analysis which can be computationally afforded within a given period of time, control of round-off errors and the accumulation of those rounding errors through the processing of the data frames.

Fine feature resolution in minimum time leads to performing millions and often billions of arithmetic operations per generated pixel or output data point. The use of floating point arithmetic to provide dynamic range control and flexible rounding error control is quite common. Algorithmic flexibility is a priority, due to the continuing software evolution and the availability of many different applications. These differing applications often require very different software.

The application software development requirements are very consistent. In particular, most applications need numerous programs, mostly written in the procedural computer programming languages, C, C++ and FORTRAN (see references [11]–[18]). Use of machine level programming is restricted to the most performance critical portions of the programs.

Typical algorithms for performing the applications discussed above, have many common features such as a need for large amounts of memory per processing element, often in the range of 100 MB; a need for very large numbers of arithmetic calculations per output value (pixel, data point, etc.); a need for very large numbers of calculations based upon most if not all input values (pixel, data point, etc.); and, relatively little required communication overhead compared to computational capacity.

Many of these algorithms use calculations that require, for example, several relatively short vectors and calculations involving complex numbers. For example, some algorithms include calculating complex valued functions such as X=(az+b)/(cz+d), wherein a, b, c, d, and z are all complex floating point numbers. The algorithms define A0, b0, c0, d0, z0 and X0 as the real components and correspondingly, a1, b1, c1, d1, z1 and X1 as the imaginary components. The calculation prior to entry into a floating point division circuit proceeds in two multiply-accumulate passes. In the first pass, the following are calculated:

$$A0 = a0*z0 - a1*z1 + b0$$

$$A1 = a0*z1 + a1*z0 + b1$$

$$B0 = c0*z0 - c1*z1 + d0$$

$$B1 = c0*z1 + c1*z0 + d1$$

In the second pass, the results of B0 and B1 are fed back into multiplier-accumulators (discussed later) as shared operands to generate:

$$C0 = A0*B0 - A1*B1$$

$$C1 = A1*B0 + A0*B1$$

$$D = B0*B0 + B1*B1$$

Finally, the division operations are performed:

$$X0 = C0/D$$

$$X1 = C1/D$$

The circuitry disclosed herein optimizes the performance of calculation of the A, B, C and D formulae above.

PRIOR ART SUMMARY

Some of the major advances relevant to this invention relate to the development of high speed micro-processors and DSP engines. High speed micro-processors and DSP engines possess great intrinsic algorithmic flexibility and are therefore used in high performance dedicated frame rendering configurations such as the SUN network that generated Toy Story. See reference [1].

The advent of the Intel Pentium™ processors brought the incorporation of many of the performance tricks used in the RISC (Reduced Instruction Set Computing) community. "Appendix D: An Alternative to RISC: The INTEL 80×86" in reference [30] and "Appendix: A Superscalar 386" in reference [31] provide good references on this. "Appendix C: Survey of RISC Architectures" in reference [30] provides a good overview. However, commercial micro-processor and DSP systems are severely limited by their massive overhead circuitry. In modern super-scalar computers, this overhead circuitry may actually be larger than the arithmetic units. See references [30] and [31] for a discussion of architectural performance/cost tradeoffs.

High performance memory is necessary but not sufficient to guarantee fast frame generation because it does not generate the data—it simply stores it. It should be noted that there have been several special purpose components proposed which incorporate data processing elements tightly coupled on one integrated circuit with high performance memory, often DRAM. However these efforts have all suffered limitations. The circuits discussed in [32] use fixed point arithmetic engines of very limited precision. The circuits discussed in [32] are performance constrained in floating point execution, and in the handling of programs larger than a single processor's local memory.

Currently available special purpose components are not optimized to perform several categories of algorithms. These components include
1. Image compression/decompression processors.
   a. These circuits, while important, are very specialized and do not provide a general purpose solution to a variety of algorithms.
   b. For example, such engines have tended to be very difficult to efficiently program in higher level procedural languages such as C, C++ and FORTRAN.
   c. The requirement of programming them in assembly language implies that such units will not address the general purpose needs for multi-dimensional imaging and graphical frame generation without a large expenditure on software development. See references [24] and [25].
2. Processors optimized for graphics algorithms such as fractals, Z-buffers, Gouraud shading, etc.
   a. These circuits do not permit optimizations for the wide cross-section of approaches that both graphics frame generation and image processing require.
   b. See references [26]–[29].
3. Signal processing pre-processor accelerators such as wavelet and other filters, first pass radix-4, 8 or 16 FFT's, etc. 1-D and 2-D Discrete Cosine Transform engines.
   a. These circuits are difficult to program for efficient execution of the wide variety of large scale frame generation tasks.
4. Multiprocessor image processors.
   a. These processors include mixed MIMD and SIMD systems that are ill-suited to general-purpose programming. See reference [24] and [41] to [43].
   b. These processors also include VLIW (Very Long Instruction Word) SIMD ICs such as Chromatic's MPACT ICs.
   c. Such ICs again cannot provide the computational flexibility needed to program the large amount of 3-D animation software used in commercial applications, which require efficient compiler support. See references [34] and [39].
5. Multimedia signal processors.
   a. These processors also have various limitations, such as lack of floating point support, lack of wide external data memory interface, access bandwidth to large external memories, deficient instruction processing flexibility and data processing versatility, and reliance on vector processors which are inefficient and difficult to program for operations without a very uniform data access mechanism concerning accumulating results. See, for example, references [35]–[38].

BACKGROUND IN ARITHMETIC CIRCUITRY

Following is a list of some of central problems to achieving high performance multiplication and add/subtraction. Of course, this list is not exhaustive, but provides some of the barriers that currently available devices have run up against.

CARRY PROPAGATION ADDERS

Addition and subtraction typically involve the propagation of carry information from each digit's result to all higher digits. If there are two n bit operands, the time it takes to perform such operations is $O(n)$. As operands get larger, more time is required by such circuitry.

By the time of the ILIAC III(mid 1970's), local carry propagate addition algorithms had been discovered. Such algorithms have the advantage of determining a local carry bit from examination of only a few neighboring bits of the operands. The consequence of using one of these schemes is that adds and subtract essentially take a constant amount of time, no matter how large the operands become. Several such algorithms have been discovered and are now considered standard tools by practitioners, embodied in circuitry such as carry save adders and redundant binary adders.

Multiplication Algorithms

There are several known multiplication algorithms of varying levels of utility. A popular algorithm is known as Booth multiplication algorithm. The basic idea of Booth's algorithm is to skip over individual iterations in an iterative shift-and-add implementation of the multiplication. The algorithm skips over 0 bits in the multiplier, and it skips over sequences of 1 bits. The idea is that a sequence of N 1' in the multiplier is numerically equal to $2_N-1$, so the effect of multiplying by this group of 1's is the same a as subtraction in the least significant position, followed by an addition N positions to the left.

In a Booth algorithm, the B multiplicand may be decomposed into overlapping collections on k+1 bits of successively greater order B[0:k], B[k:2*k], . . . For example, in a 4–3 Booth Multiplication Algorithm k is equal to 3. More details of Booth Algorithms will be well understood by one of skill in the art.

DEFINITIONS

Wire

A wire is a mechanism for sharing the state between multiple nodes of a circuit. The state is a finite alphabet based upon certain physical conditions including but not limited to: electrical voltage, current, phase, spectral decomposition, and photonic amplitude. Symbols are the individual elements of an alphabet. Measured value ranges of the relevant physical conditions typically encode symbols. The most commonly used alphabet is the set {0,1}, the binary symbol set. Binary systems using all of the above schemes exist. Other commonly used alphabets include 3 symbol alphabets, e.g., {0,1,2} also alternatively denoted as {−1,0,1}, multiple binary alphabets, e.g., {00,01,10,11}, etc. There are other alphabets in use. A wire may be embodied, for example, as a strip of metal (e.g., in an integrated circuit or on a circuit board), an optical fiber, or a microwave channel (sometimes referred to as a microchannel).

Wire Bundle

A wire bundle is a collection of one or more wires.

Bus

A bus is a wire bundle possessing a bus protocol. The bus protocol defines communication between circuits connected by the wire bundle. A bus will typically be composed of component wire bundles wherein one or more of the component wire bundles will determine which connected components are receiving and which are transmitting upon one or more of the other component wire bundles.

Floating Point

Floating point notation includes a collection of states representing a numeric entity. The collection includes sub-collections of states defining the sign, mantissa and exponent of the represented number. Such notations non-exclusively include binary systems including but not limited to IEEE standard floating point and special purpose floating point notations including but not limited to those discussed in the references of this specification. A floating point notation non-exclusively includes extensions whereby there are two sub-collections each containing the sign, mantissa and exponent of a number as above. The numeric representation is of an interval wherein the number resides. A floating point notation additionally includes non-binary systems, wherein the mantissa and exponent refer to powers of a number other than 2.

Programmable Finite State Machine

A programmable finite state machine is a machine which includes a state register, possibly one or more additional registers wherein state conditions, quantities, etc. reside, and a mechanism by which the state register, additional registers, external inputs generate the next value for the state register and possible additional registers.

SIMD

A Single Instruction Multiple Datapath (SIMD) architecture executes the same instruction on more than one datapath during the same instruction execution cycle. A typical extension to this basic concept is the incorporation of "status flag bits" associated with each datapath. These flags enable and disable the specific datapath from executing some or all of the globally shared instructions.

SIMD architectures are optimal in situations requiring identical processing of multiple data streams. The inherent synchronization of these data streams produce advantages by frequently simplifying communications control problems. SIMD architectures generally become inefficient whenever the data processing becomes dissimilar between the datapaths.

SIMD architectures require a relatively small amount of instruction processing overhead cost because there is only one instruction processing mechanism, shared by the datapaths. The instruction processing mechanism has an instruction fetching mechanism. The datapath collection typically needs only one instruction memory.

MIMD

A Multiple Instruction Multiple Datapath (MIMD) architecture executes distinct instructions on different datapath units. The fundamental advantage of this approach is flexibility. Any data processing unit can execute its own instruction, independently of the other data processing units. However, this flexibility has added costs. In particular, each data processing unit must possess its own instruction fetching, decoding, and sequencing mechanisms. The instruction fetching mechanism frequently possesses at least a small memory local to the data processor. This local memory is often a cache.

(Very) Long Instruction Word Processors

A (Very) Long Instruction Word Processor (VLIW and LIW, respectively) is a class of architectures whereby is a single instruction processing mechanism contains a program counter capable of common operations such as branches on condition codes, and multiple instruction fields that independently control datapath units. In these architectures, the datapath units often are not identical in structure or function.

Array Processor

An Array Processor is defined as an LIW or VLIW instruction-processing architecture having multiple datapath units arranged into one or more collections. In embodiments of the present invention, as will be described, the datapath collections receive and may act upon a common operand received via a common operand bus having a transmitting unit; each datapath receives one or more additional operands from memory; each datapath collection contains an instruction memory possessing instruction fields that control the operation of the program controlled elements within; each datapath unit contains one or more multiplier/accumulators (MACs); and each MAC possesses a multiplicity of accumulating registers.

Multiplier-Accumulator

A Multiplier-Accumulator is an arithmetic circuit simultaneously performing multiplication of two operands and addition (and possibly subtraction) of at least one other operand.

Fast Fourier Transform (FFT)

The fast Fourier transform is a highly optimized algorithm for generating the spectrum of a signal. See the relevant chapters of references [11], [12], and [15] for thorough discussions of the various involved topics.

Vector Processor

A vector processor is an architecture designed to operate exclusively on vectors. Typically, a vector processor is deeply pipelined. There is a large literature devoted to vector processing. See references [46]–[53]. Appendix B, "Vector Processors" in reference [30] provides an overview on the subject.

SUMMARY OF THE INVENTION

The present invention provides an arithmetic engine for multiplication and addition/subtraction that avoids the above-described limitations with regard to computation for video frame rendering and DSP tasks. This invention addresses such performance requirements in a manner more efficient than prior circuitry both in terms of silicon utilization for the performance achieved and in terms of ease of coding.

According to an aspect of the present invention a digital logic circuit which performs multiple floating point operations concurrently is provided. The logic circuit comprises a shared operand generator that receives a first operand and outputs a result that is a fixed function of the first operand, and an arithmetic circuit. The arithmetic circuit includes a plurality of multiply circuits, each of the plurality of multiply circuits having circuitry to calculate partial products from multiplying a second operand with the the first operand and with the results of the shared operand generator. It also includes circuitry to selectively calculate a sum of the partial products and a third operand and produce an arithmetic result.

According to another aspect of the present invention, a device for performing multiply/accumulate operations based upon a multiplication algorithm utilizing successive small bit multiply operations is provided. The device includes a plurality of small bit multipliers, wherein each of the plurality of small bit multipliers operates to perform the multiplication algorithm on a first input and one of the bits of a second input to calculate a plurality of partial products. It also includes an adder tree for adding the partial products to calculate a multiply/accumulate result.

In yet another aspect of the present invention, an arithmetic circuit for performing floating point operations is provided. Two strips of consecutive logic cells are provided to operate on the mantissas of two floating point operands. A comparator is provided to compare the exponents of the two operands. If the exponent of the first operand is larger than the exponent of the second operand, then the two strips of consecutive logic cells are arranged with the second strip being consecutively after the first strip. A carry signal from the most significant logic cell of the first strip is coupled to the least significant logic cell of the second strip. If the exponent of the second operand is larger than the exponent of the first operand, then the two strips are arranged in the opposite order consecutively so that the carry bit of the most significant logic cell of the second strip may be coupled to the least significant logic cell of the first strip.

A comparator determines the difference in the exponents and shifts the second operand with respect to the first operand accordingly. By this arrangement, the first operand is coupled to the first strip and the second operand is shifted between the first strip and the second strip. The overlapping bits are operated upon by the logic cells, while the non-overlapping bits are passed along without change by putting a zero value as the second operand.

A further understanding of the nature and advantages of the present invention may be realized by reference to the remaining portions of the specification and the drawings.

DETAILED DESCRIPTION OF THE SPECIFIC EMBODIMENTS

Figure 1:
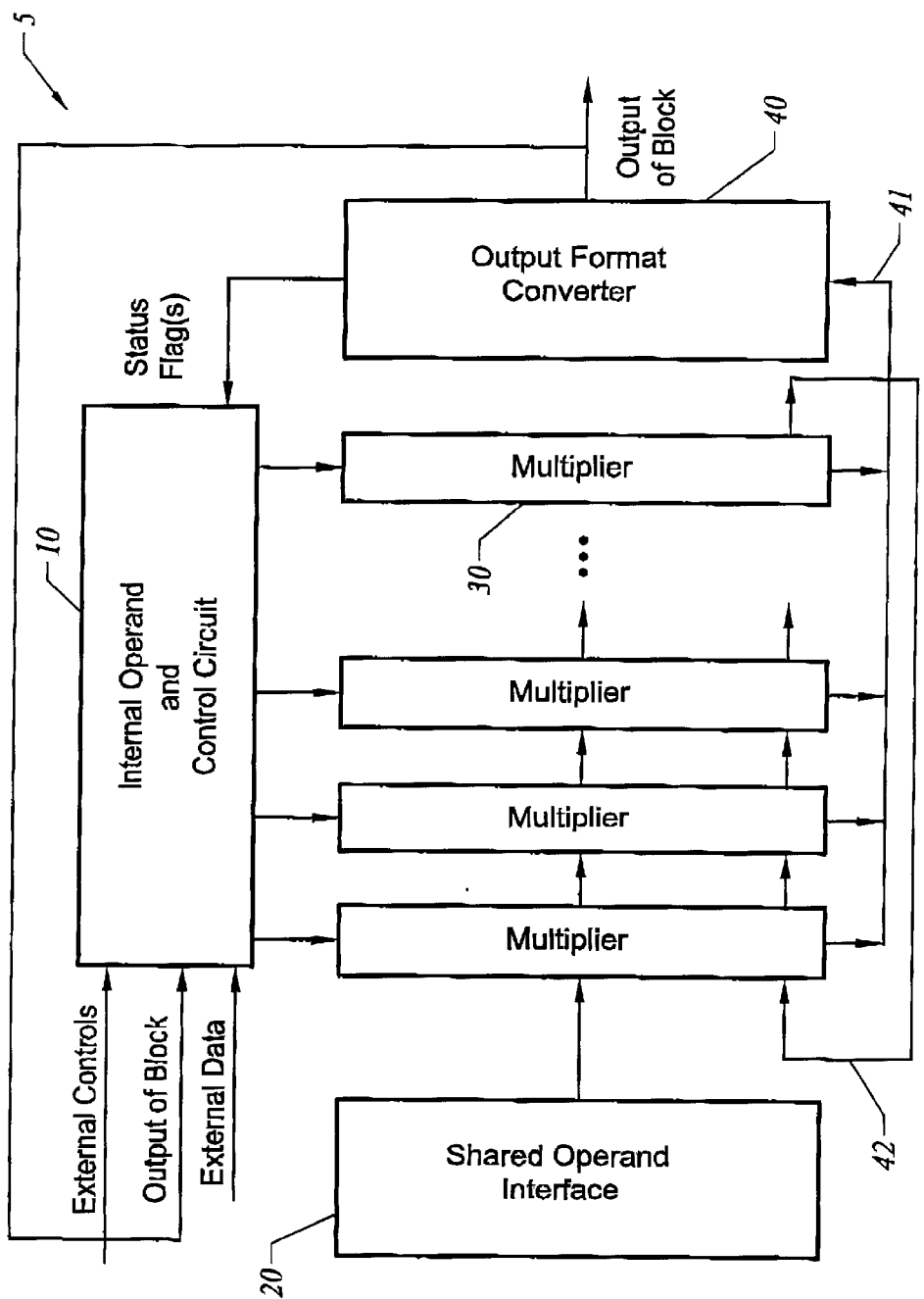
FIG. 1 is a block diagram of an embodiment of an arithmetic circuit according to the present invention.

FIG. 1 is a block diagram of an arithmetic circuit 5 which performs more than one (say "N") floating point multiplications upon one shared floating point operand by "N" multiplier units 30 in parallel.

Figure 2:
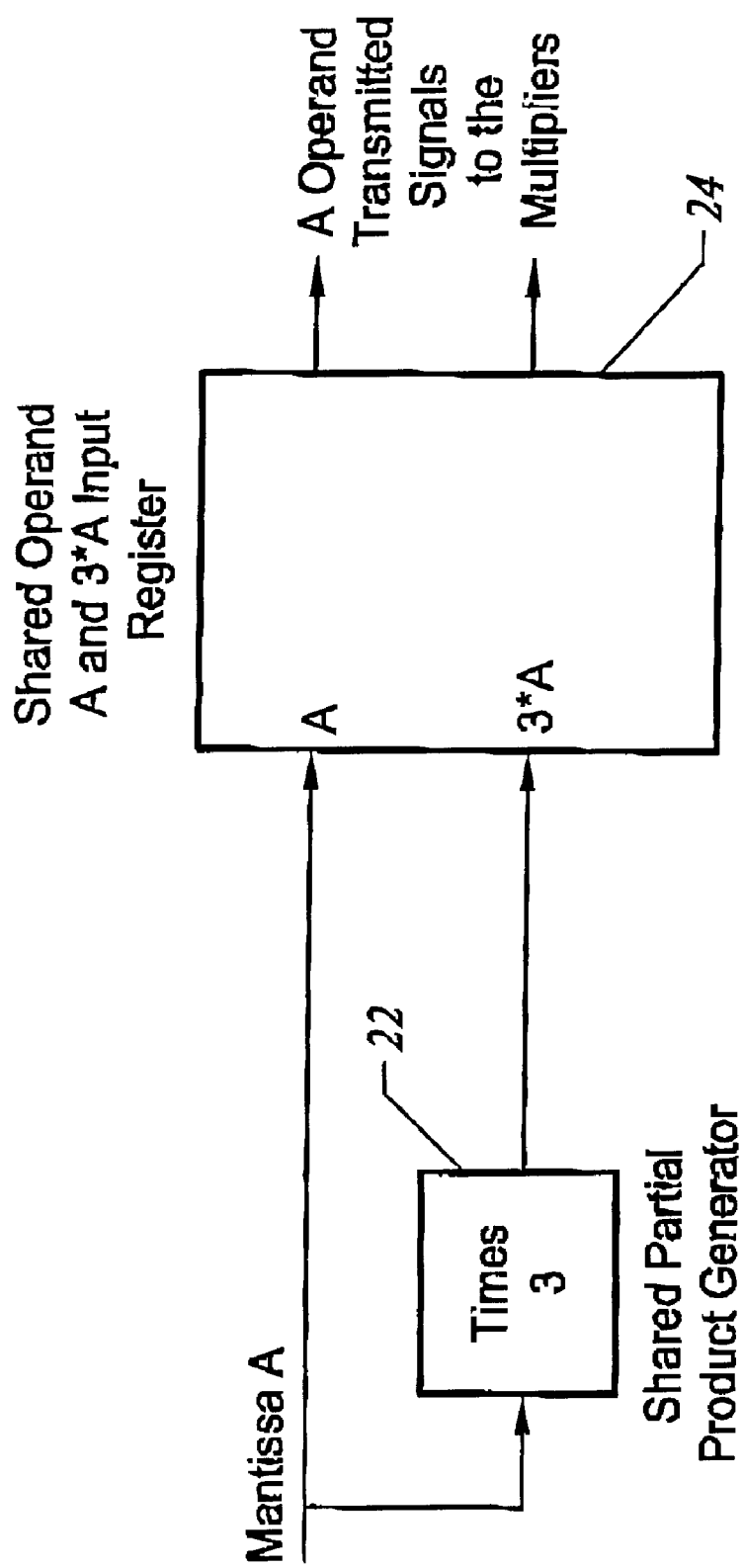
FIG. 2 is a block diagram of a Shared Operand Interface.

The mantissa of shared operand "A" is first received by a sub-circuit 20 called the Shared Operand Interface, which is further comprised of Shared Partial Product Generator 22 and Shared Operand Input Register 24 as shown in FIG. 2. Shared Partial Product Generator 22 generates any specialized partial sums which would otherwise be redundantly required to be generated in each of multiplier units 30. In situations wherein a 4-3 Booth multiplier algorithm is employed, such specialized partial sums would be a specialized "multiply by 3" circuit. Other algorithms may benefit from other fixed functions and may be substituted for the "multiply by 3" circuit of FIG. 2.

Shared Operand Input Register 24 comprises amplifiers of wire bundles for A and 3*A before these signals are distributed to Multipliers 30. In subsequent discussions of other components, the mantissa of operand A will be assumed to comprise both A and 3*A.

Figure 3:
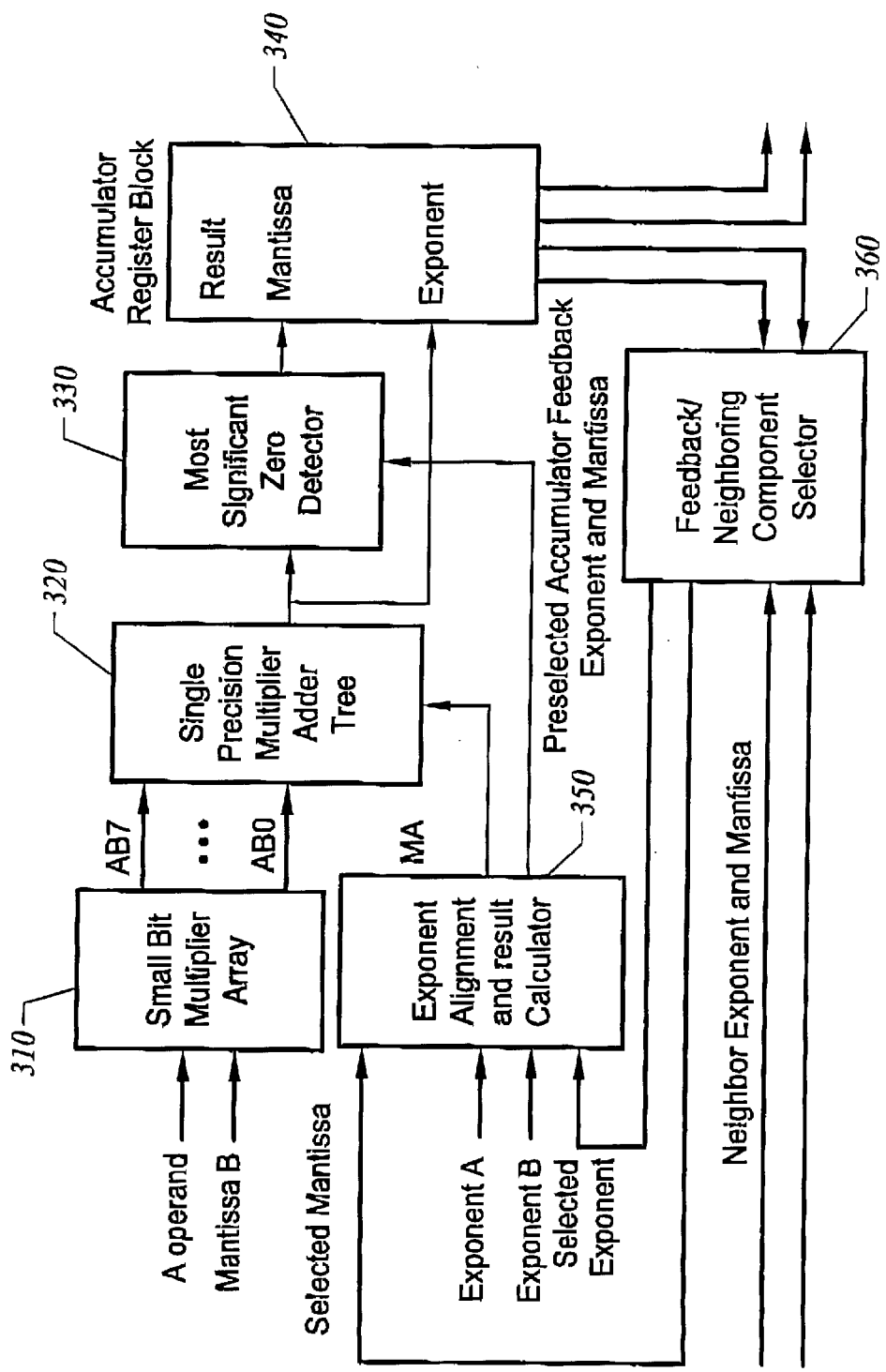
FIG. 3 is a block diagram of a Single Precision Multiplier.

FIG. 3 is a block diagram of Multiplier 30. Each Multiplier 30 is comprised of a Small Bit Multiplier Array 310, a Single Precision Multiplier Adder Tree 320, a Most Significant Zero Detector 330, an Accumulator Register Block 340, an Exponent Alignment and Result Calculator 350, and a Feedback/Neighboring Component Selector 360.

Figure 4:
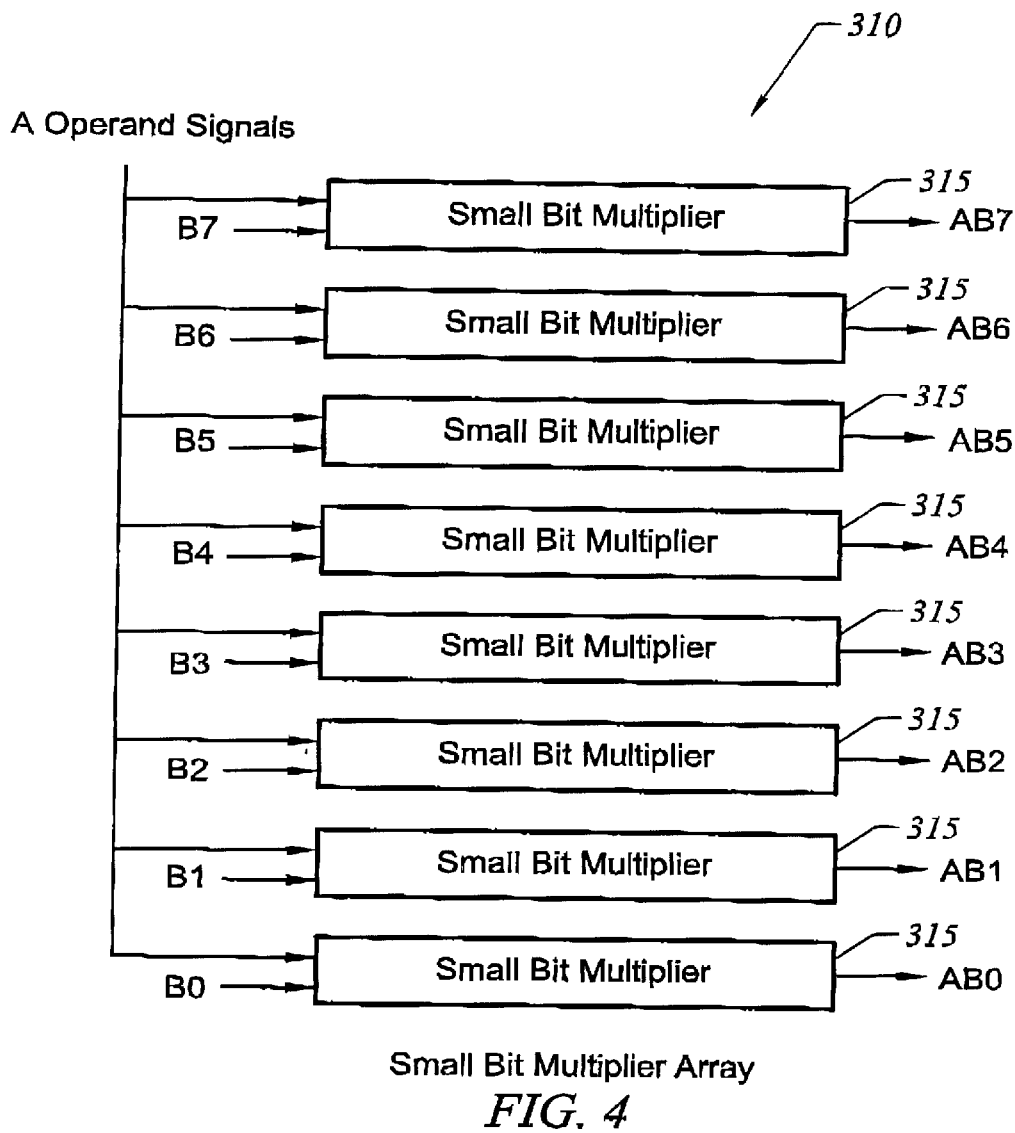
FIG. 4 is a more detailed block diagram of a Small Bit Multiplier Array of the Single Precision Multiplier of FIG. 3.

FIG. 4 is a block diagram of Small Bit Multiplier Array 310. In the specific embodiment, it comprises 8 instances of a Small Bit Multiplier 315. Each instance 315(k) of Small Bit Multiplier 315 receives the A Operand Signals and a component of the B operand's mantissa B(k), where k is a number from 0 to 7. Each of the instances generates a resulting partial product AB(k) which represents the product of the mantissa of A with the component B(k) of mantissa B. Mantissa B will be said to be composed of bits B[i] where I ranges from 0 to 24. Bit B[0] is the least significant bit. Each component Bk of mantissa B is composed of bits B[3*k], B[3*k+1], B[3*k+2] and B[3*k+3], where k ranges from 0 to 7.

In the specific embodiment, Small Bit Multiplier Array 310 implements a 4-3 Modified Booth Multiplication algorithm on the A Operand Signals and B(k), where k ranges from 0 to 7. It outputs a set of partial products AB(k). As has been disclosed above, these results AB(k) are not exactly the same as A*B(k), but they are closely related, and when taken as whole such an operation is in effect achieved.

For the sake of conceptual clarity in the following discussion, this notation will be used herein to convey the essential intent, the details where relevant will be included. For the sake of further conceptual convenience, consider each B(k) to be essentially composed of bits B[3*k], B[3*k+1], B[3*k+2], where k ranges from 0 to 7. Note that the integer multiplication of the mantissas of A and B generates a 48 bit result.

Given the above notational simplification, the following summarizes the mantissa component operation of A*B:

$$A*B = A*B0 + A*B1*2^3 + A*B2*2^6 + A*B3*2^9 + A*B4*2^{12} + A*B5*2^{15} + A*B6*2^{18} + A*B7*2^{21}$$

or $$A*B = AB0 + AB1*2^3 + AB2*2^6 + AB3*2^9 + AB4*2^{12} + AB5*2^{15} + AB6*2^{18} + AB7*2^{21}$$

The task of performing these shifts and additions is carried out by the Single Precision Multiplier Adder Tree 320. The Single Precision Multiplier Adder Tree 320 also performs a scaled addition of the mantissa of an accumulator of either the multiplier's accumulator register block or of a neighboring multiplier's register block.

Figure 5A:
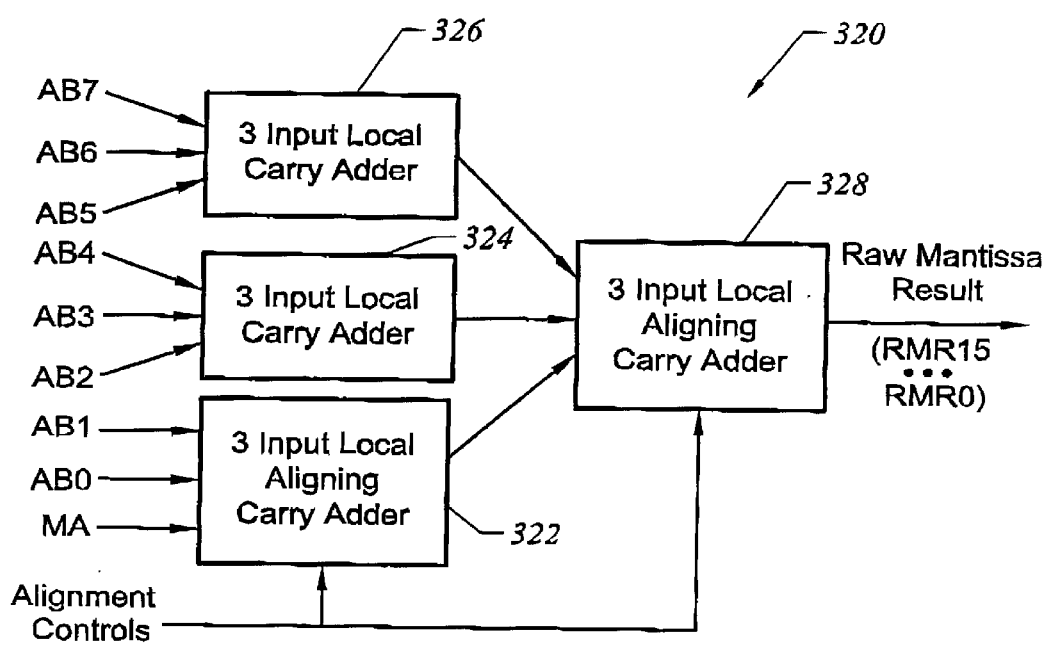
FIG. 5A is a more detailed block diagram of a Single Precision Multiplier Adder Tree of the Single Precision Multiplier of FIG. 3.

Single Precision Multiplier Adder Tree 320 is comprised of four Local Carry Propagate Adders 322, 324, 326 and 328 as shown in FIG. 5A. All of these adders receive three input operands and generate one output.

In the specific embodiment mantissa multiplication without accumulation is performed as follows:

a. Local Carry Propagate Adder 322
   i. receives AB0, AB1 as inputs and
   ii. generates $MAB01=AB0+AB1*2^3$
b. Local Carry Propagate Adder 324
   i. receives AB2, AB3 and AB4 as inputs and
   ii. generates $AB234=AB2+AB3*2^3+AB4*2^6$.
   iii Note that $AB234 *2^6=AB2*2^6+AB3*2^9+AB4*2^{12}$.
c. Local Carry Propagate Adder 326
   i. receives AB5, AB6 and AB7 as inputs and
   ii. generates $AB567=AB5+AB6*2^3+AB7*2^6$.
   iii. Note that $AB567 *2^{15}=AB5*2^{15}+AB6*2^{18}+AB7*2^{21}$.
d. Local Carry Propagate Adder 328
   i. receives MAB01, AB234 and AB567 as inputs and
   ii. generates the Raw Mantissa Result MAB as
   iii. $MAB=MAB01+AB234*2^6+AB567*2^{15}$ or equivalently,
   iv. $MAB=AB0+AB1*2^3+AB2*2^6+AB3*2^9+AB4*2^{12}+AB5*2^{15}+AB6*2^{18}+AB7*2^{21}$ Floating point addition and subtraction requires mantissa alignment. Unlike multiplication, the result of an addition or subtraction of floating point numbers is strongly affected by the exponents of the operands. For example, consider the following identity in base 10 scientific (floating point) notation 1E5+1E4=1.1E5. Stated differently, this is 100,000+10,000=110,000. According to floating point convention, non-zero floating point numbers are aligned so that there is a presumed highest order bit value of '1'. As in the example, the difference in exponents will require an alignment of mantissas(including the implicit hidden most significant bit) to perform the operation.

Dynamic range overflow errors can be minimized by "keeping" more than the requisite minimum mantissa bits in the accumulators. As an example of dynamic range overflow problem, the equation $7*2^{23}+1-2^{25}-2^{24}=2^{23}+1$ can only be calculated accurately in floating point with an accumulator greater than 24 bits, otherwise the "1" would be lost. It is known in the art to keep a few extra bits, often known as "guard bits", "sticky bits" and the like. Such circuits have been around for many years to limit the effects of rounding error problems. See references [30] and [71].

It is also known to have double length or larger mantissa storage in accumulators. Such circuitry often supports multiple-cycle double precision arithmetic. See reference [71]. Similar algorithmic requirements have been explored in a variety of contexts, perhaps most notably in reference [73].

The present invention incorporates the addition or subtraction of the accumulator's mantissa into the operation of the mantissa multiplier's adder tree. In currently available devices, it is more typical that the accumulation occurs "after" the complete formation of the mantissa product. See reference [75]. It is advantageous to incorporate the accumulation into the mantissa multiplier tree because then it effectively "disappears" from the critical path of the circuit. This is shown at a high level in FIG. 5A.

Table 1 represents the adder cells in Local Carry Adder 322. Each cell of the table represents a collection of 3 instances of 1 bit adder cells. There are two strips of local carry adder cells one for each column. Table 1 uses the following notation. X[i:j] are the redundant binary digits of the i to j position, with j>i. X[0] is the redundant binary digit representing an element of {−1,0,1}. x[1] is the redundant binary digit representing an element of {−2,0,2}. X[−1] is the redundant binary digit representing an element of {−½, 0,½}. X can be AB0, AB1, MAB01, OV or NV.

OV[i] represents the Overlapping Value of the shift aligned redundant binary digits received from the Exponent Alignment and Result Calculator 350.

NV[i] refers to the Non-overlapping Value of the selected component's shift aligned mantissa.

1. If the exponent of the selected component is greater than or equal to the resulting product's exponent then the right hand column represents higher value redundant binary digits in the generated result.
   a. If the selected component's digit in the digit location I does not overlap with the multiplication's mantissa at that digit location, then NV[i] presents the shifted redundant digit to adder cell I of the right hand column, otherwise NV[i] presents '0' to adder cell I of the right hand column.
2. If the exponent of the selected component is smaller then the resulting product's exponent, then the right hand column represents lower value redundant binary digits in the generated result.
   a. If the selected component's digit in the 47-I location does not overlap with the multiplication's mantissa at that digit location
      i. then NV[i] presents the shifted redundant digit to adder cell I of the right hand column
      ii. else NV[i] presents '0' to adder cell I of the right hand column.

It is important to note that selected component's mantissa alignment is performed by logical rotation of the digits either left or right, depending upon the difference in exponents. If they are the same, no shift is performed. The right hand column is not used.

If selected component is 1 greater than the multiplication's exponent, then the right hand column represents addition bits of greater numerical magnitude than those in the left hand column. The shift is 1 redundant digit to the left, so that the most significant digit of the selected component is presented to the right column's least significant digit's adder cell. All other right hand column digit adder cells are presented with '0'.

If the selected component is 1 smaller than the multiplication's exponent, then the right hand column represents addition bits of lesser numerical magnitude than the left hand column. The shift is 1 redundant digit to the right, so that the most significant digit's adder cell receives the least significant digit of the selected component. All other right hand column digit adder cells are presented with '0'. This mechanism leads to very efficient VLSI implementations.

Figure 5B:
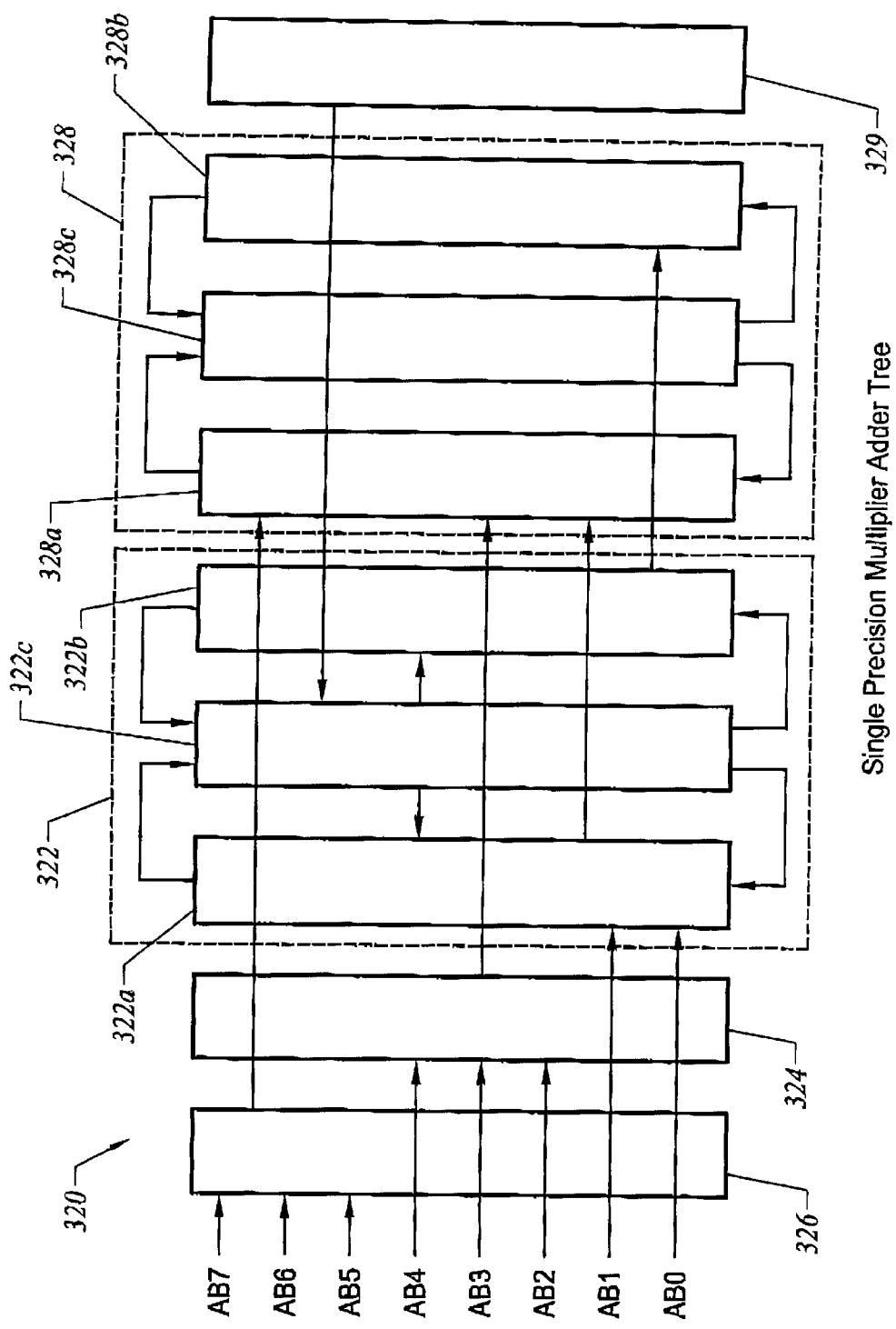
FIG. 5B depicts the Single Precision Multiplier Adder Tree of FIG. 5A from a layout and wire flow perspective.

FIG. 5B shows a specific embodiment of the implementation of a local carry adder 322 according to Table 1. The left hand column of Table 1 corresponds to block 328*a*. The right hand column corresponds to block 322*b*. Column 322*c* generates the corresponding digit values for the blocks 328a and 329*b* (OV[i:j] and NV[i:j], respectively) of the accumulator/neighbor feedback mantissa, which has been rotated by block 329. Column 322c also directs the local carry propagation between the two blocks 322a and 322b as described herein.

Table 3 represents the operation of 3 Input Local Aligning Carry Adder 328. The resulting sum of this adder is ABC, where the right hand column again represents the strip of

TABLE 1

| Fixed Inputs#rotatable inputs = output | #rotatable inputs = output (if ac_ex>mul_ex) == Otherwise |
|---|---|
| #OV[45:47]=MAB01[45:47] | #NV[45:47]=MAB01[93:95]==MAB01[−3:−1] |
| #OV[42:44]=MAB01[42:44] | #NV[42:44]=MAB01[90:92]==MAB01[−6:−4] |
| #OV[39:41]=MAB01[39:41] | #NV[39:41]=MAB01[87:89]==MAB01[−9:−7] |
| #OV[36:38]=MAB01[36:38] | #NV[36:38]=MAB01[84:86]==MAB01[−12:−10] |
| #OV[33:35]=MAB01[33:35] | #NV[33:35]=MAB01[81:83]==MAB01[−15:−13] |
| AB1[27:29]#OV[30:32]=MAB01[30:32] | #NV[30:32]=MAB01[78:80]==MAB01[−18:−16] |
| AB0[27:29]+AB1[24:26]#OV[27:29]=MAB01[27:29] | #NV[27:29]=MAB01[75:77]==MAB01[−21:−19] |
| AB0[24:26]+AB1[21:23]#OV[24:26]=MAB01[24:26] | #NV[24:26]=MAB01[72:74]==MAB01[−24:−22] |
| AB0[21:23]+AB1[18:20]#OV[21:23]=MAB01[21:23] | #NV[21:23]=MAB01[69:71]==MAB01[−27:−25] |
| AB0[18:20]+AB1[15:17]#OV[18:20]=MAB01[18:20] | #NV[18:20]=MAB01[66:68]==MAB01[−30:−28] |
| AB0[15:17]+AB1[12:14]#OV[15:17]=MAB01[15:17] | #NV[15:17]=MAB01[63:65]==MAB01[−33:−31] |
| AB0[12:14]+AB1[9:11]#OV[12:14]=MAB01[12:14] | #NV[12:14]=MAB01[60:62]==MAB01[−36:−34] |
| AB0[9:11]+AB1[6:8]#OV[8:11]=MAB01[9:11] | #NV[9:11]=MAB01[57:59]==MAB01[−39:−37] |
| AB0[6:8]+AB1[3:5]#OV[6:8]=MAB01[6:8] | #NV[6:8]=MAB01[54:56]==MAB01[−42:−40] |
| AB0[3:5]+AB1[0:2]#OV[3:5]=MAB01[3:5] | #NV[3:5]=MAB01[51:53]==MAB01[−45:−43] |
| AB0[0:2]#OV[0:2]=MAB01[0:2] | #NV[0:2]=MAB01[48:50]==MAB01[−48:−46] |

Table 2 represents the operation of the 3 input local carry adders 324 and 326. In both columns (3 input local carry propagate adders), there is a fixed set of inputs to each adder cell. Note the adder result AB234[36:38] and correspondingly, AB456[36:38]. These are more digits than would at first seem necessary. However, redundant notations will often need these bits in calculating the most significant bits of a product. Table 2 does not show the relative location at the layout level for these operations.

local carry propagate adder cells wherein they can be positioned as either more significant than the fixed sum cells or as less significant than the fixed sum cells, based upon the comparison of the exponents of the multiplication and accumulation operations as before.

Referring to FIG. 5B, the left hand column of Table 3 corresponds to block 328a. The right hand column of Table 3 corresponds to block 329b of FIG. 5B. Block 328c directs the carry propagate between blocks 328a and 328b.

TABLE 2

| Adder 324 Inputs = output | Adder 326 Inputs = output |
|---|---|
| =AB234[36:38] | =AB567[36:38] |
| +AB4[27:29]=AB234[33:35] | +AB7[27:29]=AB567[33:35] |
| AB3[27:29]+AB4[24:26]=AB234[30:32] | AB6[27:29]+AB7[24:26]=AB567[30:32] |
| AB2[27:29]+AB3[24:26]+AB4[21:23]=AB234[27:29] | AB5[27:29]+AB6[24:26]+AB7[21:23]=AB567[27:29] |
| AB2[24:26]+AB3[21:23]+AB4[18:20]=AB234[24:26] | AB5[24:26]+AB6[21:23]+AB7[18:20]=AB567[24:26] |
| AB2[21:23]+AB3[18:20]+AB4[15:17]=AB234[21:23] | AB5[21:23]+AB6[18:20]+AB7[15:17]=AB567[21:23] |
| AB2[18:20]+AB3[15:17]+AB4[12:14]=AB234[18:20] | AB5[18:20]+AB6[15:17]+AB7[12:14]=AB567[18:20] |
| AB2[15:17]+AB3[12:14]+AB4[9:11]=AB234[15:17] | AB5[15:17]+AB6[12:14]+AB7[9:11]=AB567[15:17] |
| AB2[12:14]+AB3[9:11]+AB4[6:8]=AB234[12:14] | AB5[12:14]+AB6[9:11]+AB7[6:8]=AB567[12:14] |
| AB2[9:11]+AB3[6:8]+AB4[3:5]=AB234[9:11] | AB5[9:11]+AB6[6:8]+AB7[3:5]=AB567[9:11] |
| AB2[6:8]+AB3[3:5]+AB4[0:2]=AB234[6:8] | AB5[6:8]+AB6[3:5]+AB7[0:2]=AB567[6:8] |
| AB2[3:5]+AB3[0:2]=AB234[3:5] | AB5[3:5]+AB6[0:2]=AB567[3:5] |
| AB2[0:2]=AB234[0:2] | AB5[0:2]=AB567[0:2] |

TABLE 3

| Inputs = output | Inputs = output (if ac_ex>mul_ex) # Inputs = output Otherwise |
|---|---|
|  | 0#M57[36:38]=ABC[48:50] |
| M01[45:47]+ +M57[33:35]=ABC[45:47] | M01[93:95]=ABC[93:95]#M01[-3:-1]=ABC[-3:-1] |
| M01[42:44]+M24[36:38]+M57[30:32]=ABC[42:44] | M01[90:92]=ABC[90:92]#M01[-6:-4]=ABC[-6:-4] |
| M01[39:41]+M24[33:35]+M57[27:29]=ABC[39:41] | M01[87:89]=ABC[87:89]#M01[-9:-7]=ABC[-9:-7] |
| M01[36:38]+M24[30:32]+M57[24:26]=ABC[36:38] | M01[84:86]=ABC[84:86]#M01[-12:-10]=ABC[-12:-10] |
| M01[33:35]+M24[27:29]+M57[21:23]=ABC[33:35] | M01[81:83]=ABC[81:83]#M01[-15:-13]=ABC[-15:-13] |
| M01[30:32]+M24[24:26]+M57[18:20]=ABC[30:32] | M01[78:80]=ABC[78:80]#M01[-18:-16]=ABC[-18:-16] |
| M01[27:29]+M24[21:23]+M57[15:17]=ABC[27:29] | M01[75:77]=ABC[75:77]#M01[-21:-19]=ABC[-21:-19] |
| M01[24:26]+M24[18:20]+M57[12:14]=ABC[24:26] | M01[72:74]=ABC[72:74]#M01[-24:-22]=ABC[-24:-22] |
| M01[21:23]+M24[15:17]+M57[9:11]=ABC[21:23] | M01[69:71]=ABC[69:71]#M01[-27:-25]=ABC[-27:-25] |
| M01[18:20]+M24[12:14]+M57[6:8]=ABC[18:20] | M01[66:68]=ABC[66:68]#M01[-30:-28]=ABC[-30:-28] |
| M01[15:17]+M24[9:11]+M57[3:5]=ABC[15:17] | M01[63:65]=ABC[63:65]#M01[-33:-31]=ABC[-33:-31] |
| M01[12:14]+M24[6:8]+M57[0:2]=ABC[12:14] | M01[60:62]=ABC[60:62]#M01[-36:-34]=ABC[-36:-34] |
| M01[9:11]+M24[3:5]=ABC[9:11] | M01[57:59]=ABC[57:59]#M01[-39:-37]=ABC[-39:-37] |
| M01[6:8]+M24[0:2]=ABC[6:8] | M01[54:56]=ABC[54:56]#M01[-42:-40]=ABC[-42:-40] |
| M01[3:5]+ =ABC[3:5] | M01[51:53]=ABC[51:53]#M01[-45:-43]=ABC[-45:-43] |
| M01[0:2]=ABC[0:2] | M01[48:50]+M57[36:38]=ABC[48:50]#M01[-48:-46]=ABC[-48:-46] |

Now consider the Raw Mantissa Result signals (RMR0, ..., RMR15) shown leaving 3 Input Local Aligning Carry Adder 328 in FIG. 5A. The RMR0 signals include all the ABC signals in the lowest row of the preceding table, i.e. ABC[0:2] and either ABC[48:50] or ABC[-48:46], depending upon the comparison of exponents of the multiplication and accumulation operation. Similarly, RMR1 include the ABC signals of the next row of the table: ABC[3:5] and either ABC[51:53] or ABC[-45:-43]. This pattern continues in a similar fashion until the top two rows. Note that the top row is only occupied by a partial entry in the right column. These two rows are treated as one. RMR15 consists of signals ABC[45:47] and either ABC[93:95] or combination ABC[-3:-1] and ABC[47:50].

Figure 6:
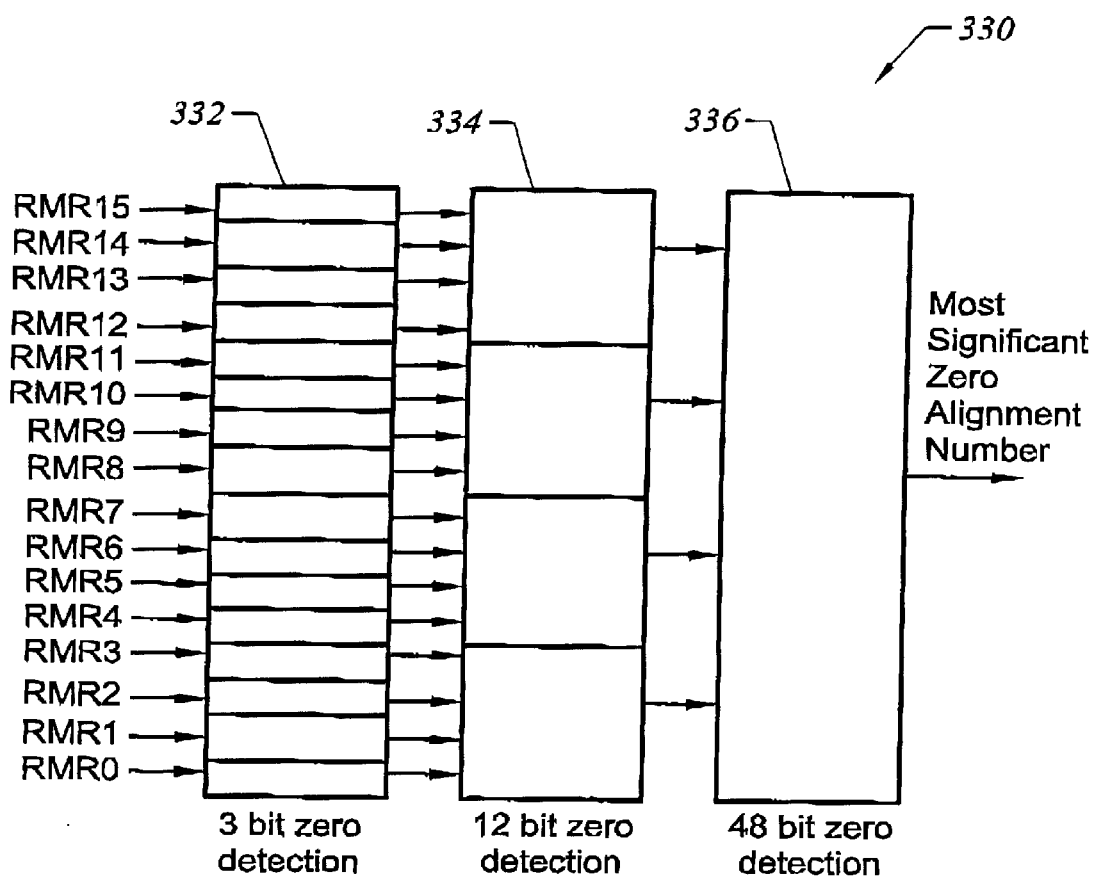
FIG. 6 is a block diagram of a Most Significant Zero Detector of the Single Precision Multiplier of FIG. 3.

Consider FIG. 6, which depicts the Most Significant Zero Detector 330. The Most Significant Zero Detector 330 receives these 16 wire bundles (RMR0 to RMR15) and first performs parallel operations upon them in a strip of 3 bit zero detection circuitry 332. The redundant binary notation can be implemented in several different ways. For the sake of simplicity of discourse, assume the following representation: 0=>00, -1=>10 and 1=>01.

Each instance of the 3 bit zero detection circuit 332 now searches to detect the most significant digit within it possessing a representation of '0' in both the fixed sum and "wrap around" sum component of its digits. Note that the logic of this cell 332 is different than the cells below it. This is to account for ABC[48:50], when required. This additional functionality tends to make this circuit be in the critical path in its performance of zero detection in this column of circuits.

This cell also modifies ABC[45:47] when ABC[48:50] are used so that only ABC[45:47] need be brought forward.

This operation does not tend to be in the critical path, as these signals are not needed until most significant zero detection is completed. Note that the fixed sum and wrap-around sum components are separately examined in parallel.

The outputs of the 3 bit zero detection circuitry are then fed to the 12 bit zero detection circuit instances 334. Again, fixed sum and wraparound sum component wire bundles are treated separately. The outputs of the 12 bit zero detection circuits 334 are fed to the 48 bit zero detection circuit 336. This is where the integration of zero detection in the fixed sum and wraparound sum component wire bundles occurs, leading to the generation of the Most Significant Zero Alignment Number. This number is used implicitly in aligning the mantissa result to fit into the mantissa component of the selected accumulator register as shown FIG. 7.

Figure 7:
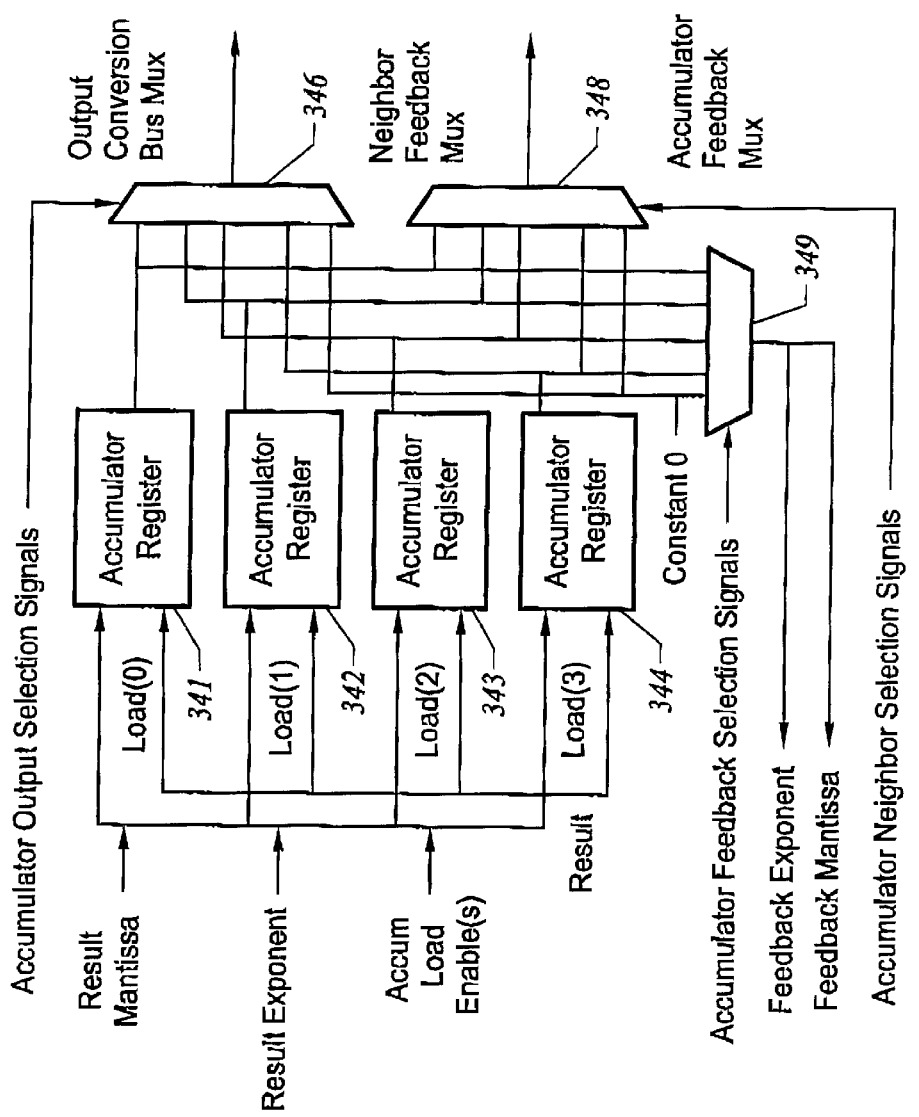
FIG. 7 is a block diagram of an Accumulator Register Block of the Single Precision Multiplier of FIG. 3.

FIG. 7 depicts one implementation of the Accumulator Register Block 340 wherein there are four Accumulator Registers 341, ..., 344 and three multiplexors providing signals to Output Conversion Bus multiplexor 346, Neighbor Feedback multiplexor 348, and Accumulator Feedback multiplexor 349.

Note also the ability to force any of these three outputs to have the constant 0. This is desirable to initialize the accumulators. While there are other ways to achieve this, most if not all other approaches require additional complexity in the controls of this block. Certain implementations of this multiplier may not need the Neighbor Feedback path, in which case the multiplexor 348 would not be implemented, and there would be a reduction of circuitry in the previously described circuits which handle those signals.

Note that Multiplexor 346, which feeds the Output Conversion Bus 41 is shown at the logic level of abstraction. It implicitly possesses tri-state bus drivers, so that the multiplicity of multipliers 30 may share this bus in communicating to the Output Format Converter 40.

Figure 8:
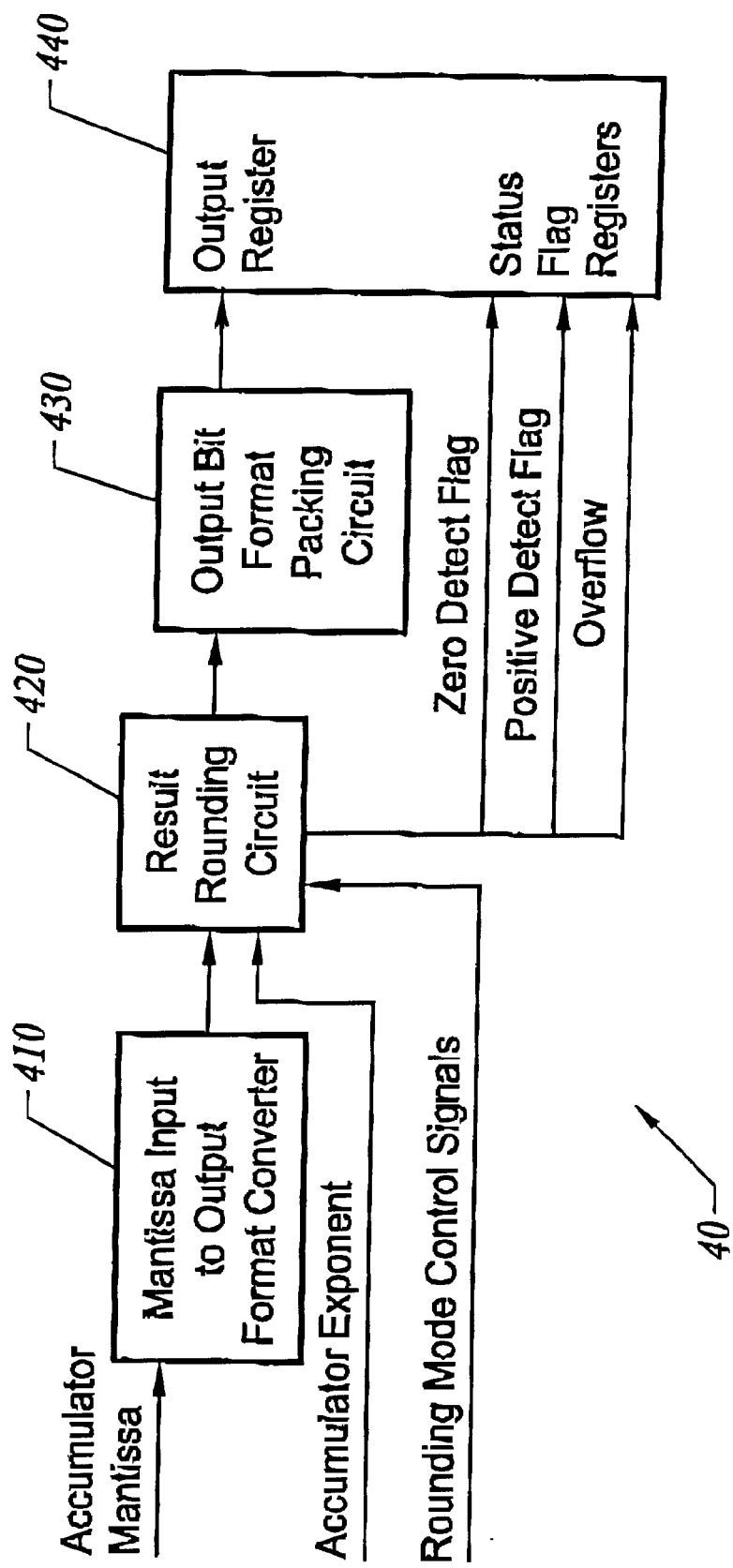
FIG. 8 is a block diagram of an Output Format Converter of the Single Precision Multiplier of FIG. 3.

FIG. 8 depicts the Output Format Converter 40. Mantissa Input to Output Format Converter 410 translates the redundant notation into standard notation. This is typically performed by subtracting the "-1" component bit vector from the "1" component bit vector with a carry propagate subtraction. The translation of redundant notation into standard notation is well known by those knowledgeable in the art. Note that other redundant binary notations will require slightly different but comparable circuitry to achieve this result.

Result Rounding Circuit 420 performs whatever rounding operation is specified for the arithmetic operations performed on the output result of the accumulator. It examines the result of the Mantissa Input to Output Format Converter 410, as well as the selected Accumulator Exponent. Note that a minimum of three status signals are generated by this unit: Zero Detect Flag, Positive Detect Flag and Overflow. Such signals are the minimum signals necessary to semantically support high level procedural languages such as FORTRAN, C, PASCAL and Java. Rounding operations are well disclosed in the literature and will not be described herein.

Output Bit Format Packing Circuit 430 is well disclosed in prior art and will not be described in detail herein.

Output Register 440 receives the output formatted result of rounding the contents of an accumulator and whatever status flags are generated based on the contents of that register.

Figure 9:
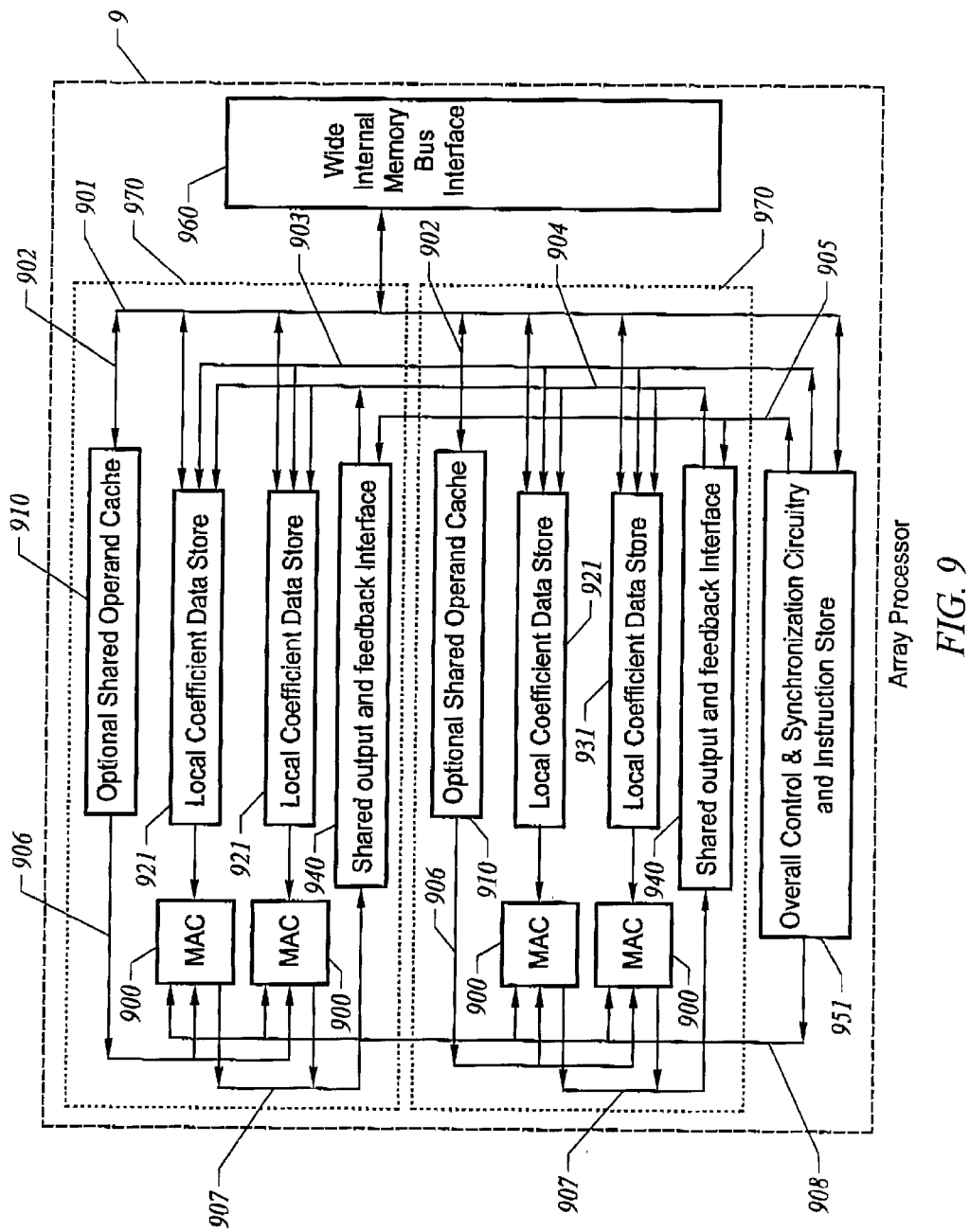
FIG. 9 depicts a preferred embodiment of device incorporating two instances of an arithmetic processing unit.

FIG. 9 is a block diagram of an array processor 9 incorporating two instances of a specific embodiments of an Arithmetic Processing Unit (APU) 970. APU 970 may preferably the arithmetic circuit 5 (FIG. 1) described above. The APU 970 includes a Shared Operand Circuit (SOC) 910 which acts as a multiplier input circuit. Shared operand interface 20 (FIG. 2) may be used as SOC 910 or as a part of SOC 910. Optionally, the SOC 910 includes a RAM circuit having address controls that determine whether the RAM may be used as an operand cache or a first-in-first-out (FIFO) queue. A first sub-circuit (not shown in the figure) within the SOC 910 includes a multiplicity of input registers for accepting input and capturing the state of the wire bundle 902. The SOC 910 contains a second sub-circuit (not shown) coupled to the registers within the first sub-circuit.

The second sub-circuit includes an integer Arithmetic Logic Unit (ALU) (not shown). The second sub-circuit performs fixed point add/subtracts (in the ALU) on selected fields of the state of the wire bundle 902 from the registers. The second sub-circuit also converts the fixed point result of the add/subtract operation or of the selected fields of the input registers into an internal floating point notation according to known conversion algorithms. Therefore, the second sub-circuit is said to contain a floating point conversion unit (not shown).

The APU 970 also includes two or more Multiplier/Accumulators (MACs) 900 as the datapath processing units. A specific embodiment of MACs 900 was described above, although other types of MACs 900 may also be used. Each MAC 900 is coupled to wire bundle 906 for receiving a shared operand from the SOC 910. Each MAC 900 is also coupled to a corresponding Local Data Store 920. In general, there are as many local data memory circuits 920 as MACs 900.

During operation, each MAC 900 receives 3 numbers X, Y and Z in some numeric format. X is the shared operand received via wire bundle 906. Y and Z are received from the local data store 920 via wire bundle 909.

Each MAC 900 possesses two or more accumulator registers, preferably at least four. Each MAC 900 can perform a multiplication and an add/subtract in each clock cycle to thereby generate XY+Z or XY−Z from values of X, Y and Z received in the (possibly) current or predecessor clock cycles. Each MAC 900 conditionally stores the generated result in one of its registers.

The APU 970 further includes a Shared Output and Feedback Interface (SOFI) 940. The SOFI 940 contains a floating point conversion unit (not shown) that is adapted using standard techniques to convert the internal numeric format of a wire bundle (907) to the requisite floating point (e.g., IEEE floating point) or fixed point notation needed externally. Of course, in embodiments in which the internal floating point representation is identical to the external representation, then that particular conversion need not be performed.

The SOFI 940 controls the transmission of the results of such conversions upon a wide bus 901 to the APIC 965. In a particular embodiment, the SOFI 940 also temporarily stores such results as necessary prior to transmission. The data memory 920 has a corresponding address generator (in, e.g., module 950, discussed below) for providing addresses for access. The addresses used to fetch the Y and Z operands may or may not be identical. By supporting generation of distinct addresses, an advantage is provided for many applications requirements, such as FFTs.

The APU 970 includes an overall Control, Synchronization circuitry and Instruction Store unit (CSIS) 950. The CSIS 950 performs control and synchronization of the various modules of the APU 970 and includes storage for instructions. Given the architecture of the APU 970 as shown in FIG. 9 and discussed herein, the CSIS 950 has an appropriate structure for carrying out its tasks. In particular, the CSIS 951 includes (not shown in FIG. 9) a status register, a program counter, two or more loop counters, at least one index register for each Y and Z operand local memory 920 associated with each MAC 900, an instruction register, and an instruction store, all of which components are well-known in the art.

The instruction word possesses distinct fields for each of the input, output distribution, MACs 900. The status register optionally preserves at least a multiplicity of wire states. These wire states include at least state condition bits of the loop counters, a zero detect signal from the integer ALU of each SOC 910, and condition bits of the floating point conversion unit of the SOFI 940 of each APU 970.

The CSIS is adapted to request instructions from sources external to the claimed device and to buffer these instructions in its instruction store. The wire bundle 903 provides inputs to the local data stores 920. The wire bundle 903 contains at least the addresses for the component memories of each local data memory 920, and the read/write controls and page interleaving control signals of each local data memory 920.

Each APU 970 operates on two vectors, as in "vector added to vector" operations, or on one vector and a scalar, as in "scalar multiplying the elements of a vector" operations. The APU 970 is extremely versatile because an input operand is shared amongst a multiplicity of MACs and because a local memory circuit (920) or the state of another MAC's register provides the other two operands.

The array processor 9 according to the present invention enables types of computations to be performed which could not be efficiently performed using, e.g., vector processors. For example, in the calculation of several Discrete Wavelet Transform Filters (DWTFs) it is frequently necessary to share several different scalars across several sub-components of a vector. Vector processors typically required as many cycles to perform this task as the number of scalars to be shared. In these DWTFs, every even input affects all the filter outputs, and the odd inputs affect only half the filter outputs. Processing four inputs in this manner forces the limitation that the odd entries cannot be concurrently processed using the vector processor approach. In the array processor 9, however, these problems are minimized, for example because it can send two (or more) odd-entry scalar elements to different components of a vector.

Radix 2 FFTs present both the sum and difference to differing components of a vector. The present invention, by presenting these in parallel to the respective components of the vector achieves the result in one cycle, rather than two cycles per pair of elements required by vector processors. In further preferred embodiments, the number of APUs 970 can be increased beyond two.

Figure 10:
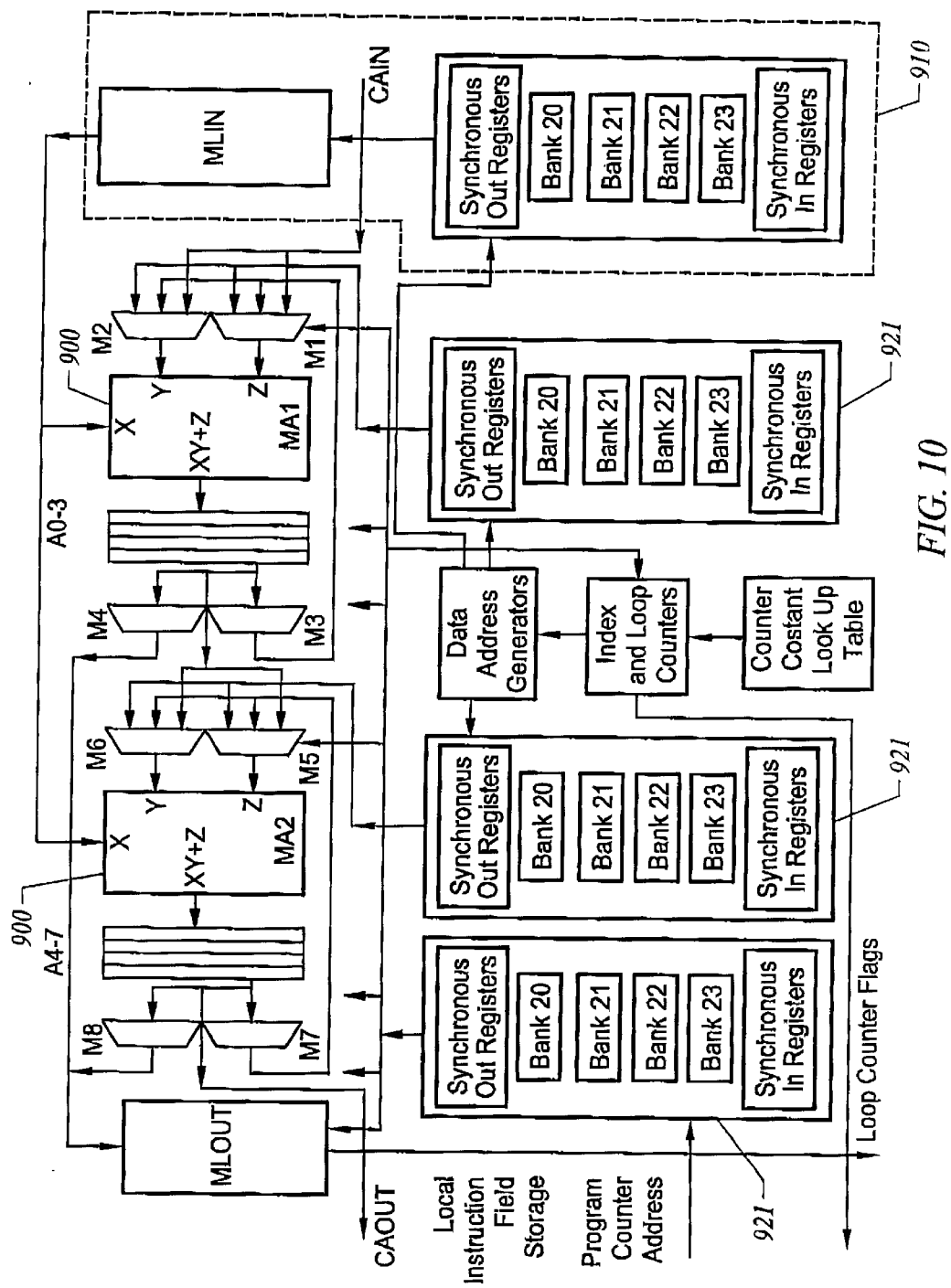
FIG. 10 depicts a data flow block diagram giving a "programmer's view" of the device shown in FIG. 9.

FIG. 10 depicts another specific embodiment of APU 970. This diagram shows a more detailed view of Shared Operand Cache (910), Local Coefficient Store (921) and Overall Control and Synchronization Circuitry and Instruction Store (951). The Shared Operand Cache (910) is shown comprising of four banks of RAM (Bank 20, 21, 22 and 23) with synchronous input and output registers plus a circuit MLIN. These four banks of RAM support 4 way interleaving, a well known high performance memory organization wherein read and write operations across these memory blocks will seldom interfere with one another. Preferably, the RAM banks are built with the least complex high speed memory available. Typically this would be 1-port static RAM of some sort.

MLIN comprises the Shared Operand Interface plus any other shared operand arithmetic circuitry required for the circuit's target application(s).

The Local Coefficient Store (921) is shown comprising of four banks of RAM (Bank 20, 21, 22 and 23) with synchronous input and output registers. These four banks of RAM support 4 way interleaving, a well known high performance memory organization wherein read and write operations across these memory blocks will seldom interfere with one another. Preferably, the RAM banks are built with the least complex high speed memory available. Typically this would be 1-port static RAM of some sort.

Overall Control and Synchronization Circuitry and Instruction Store (951) is shown comprising of a Local Instruction Field Storage, Data Address Registers, Index and Loop Counters and Counter Constant Lookup Table Advantages of Disclosed Circuitry The array processor 9, as discussed herein, reveal an architecture, or class, of circuitry which has a number of notable advantages. One such advantage is that the circuit 1 possesses very high levels of efficiency in executing specific computationally intensive algorithms in an environment compared to the performance of such algorithms on comparable sized printed circuit boards using microprocessors or conventional DSPs.

One factor in the array processor 9's low circuit size requirement is that it does not directly implement the division operation, which is actually not very common in a great number of frame rendering and DSP algorithms of interest.

In embodiments of the array processor 9 in which the MACs are configured to support only single-precision arithmetic, as is typically sufficient for a large class of frame rendering and DSP applications, the array processor 9's circuit size requirement is substantially further reduced.

The architecture of the array processor 9 provides a "front end" of fixed point addition/subtraction followed by floating point conversion (in, e.g., SOC 910), then multiplication and accumulation (in MACs 900). This "front end" can perform preliminary operations involved with symmetric, anti-symmetric FIRs, and some low radix FFT calculations. These operations are extremely useful in practical DSP applications wherein the data is often received in a fixed point version from sampling circuitry which typically generate between 8 and 16 bits of fixed point precision.

Another advantage of the array processor 9 relates to the general phenomenon of accumulating rounding errors. It is very important that DSP algorithms maintain the precision of arithmetic results. For efficiency, many prior DSP processors use algorithms that perform fixed-point arithmetic. Such fixed-point arithmetic requires a great deal of care in managing rounding errors to maintain precision. In contrast, the array processor 9 is able to efficiently perform floating point computations. Floating point computations have the advantage of providing much better dynamic range, while being considerably easier to program for the same precision of results.

It is interesting to examine the capabilities of a specific, example embodiment of the array processor 9. In the example embodiment, the array processor 9 (according to FIG. 9) receives, in its Wide Internal Memory Bus Interface 960, at least 128 bits from external sources, often a wide data path memory circuit.

The SOC 910 of each APU 970 may simultaneously receive at least 64 bits (preferably 128 bits). The SOC 910 can decompose the received data into fixed 8 bit or 16 bit integer fields. The SOC 910 can be add or subtract these fields in collections of up to 4 simultaneously.

The configuration of this example embodiment can achieve extremely high performance in computing radix-4 FFTs, among other computations.

In the example embodiment, the array processor subsystem 9 has an internal clock rate of 200 megahertz (MHZ). The following operations can be performed in every clock cycle:
1. four single precision floating point multiplies
2. 4 single precision floating point additions;
3. an integer/fixed point add/subtract operation,
4. integer/fixed point to floating point scaled conversion; and
5. floating point to fixed point scaled conversion.

In the example embodiment, the local data stores 920 are two-way interleaved to support concurrent loading from data received from accesses via the MMIC 6 while fetching the Y and Z operands for the corresponding MAC 900.

Minimal pipe stage implementations tend to have fewer gates and also longer critical paths, therefore longer clock periods, when compared to implementations with more pipe stages. The minimal pipe stage optimization Register the shared operand mantissa A and 3*A as indicated in the figure.

To optimize exponent Alignment and result Calculator performance the following are desirable. Registering the results generated in the Exponent Alignment and result Calculator of FIG. 3. The propagation delay of the actual bit digit rotation of the feedback operand will nearly balance the delay to propagate the shared operand signals. The rotation operation may be slower. In specific implementations where the rotation is slower, partial rotation say by 32 and possibly also by 16 can be incorporated into the registering of results of the Exponent Alignment and result Calculator. This assumes a rotation by powers of 2 style rotator is implemented. This optimization will change the when the feedback accumulator values are available to each multiplier's adder tree, but is otherwise equivalent.

It may be desirable to add a pipe stage. This may be done to reduce clock cycle time by 40 to 60%, maintaining efficiency of multiply/accumulates that can be performed per clock cycle. Adding a pipe stage thereby effectively doubles the effective performance.

To add a pipe stage the following changes may be made to the specific embodiment described above. In the Single Precision Multiplier Adder Tree 320 register the results of the first layer of the multiplier's adder tree. Note that the critical path is the combinatorial propagation delay of this circuit. This critical path determines the clock period. The placement of the register is done to most nearly balance this critical path and that its placement between the two layers of the adder tree does not imply that some of the logic of either layer may occur either as input to this register or be generated by outputs of the register.

In the Exponent Alignment and result Calculator 350, there is no major additional change over the performance optimization of the last paragraph assuming that a rotation by powers of two style implementation of the accumulator feedback rotation.

If an switch array style barrel shifter is implemented, the results of the barrel shift will probably need to be registered to optimize the critical path.

In Accumulator Register 340 there should be at least as many registers as there are multipliers. This is done to keep the invention from being slowed by the output format converter.

In another specific embodiment several pipe stages may be added. The goal of doing this is to reduce clock cycle time to about 25% of the original circuit, maintain the efficiency of the multiply/accumulates that can be performed per clock cycle. This may results in almost quadrupling the effective performance over the initial implementation.

Clocking mechanisms may be altered over the standard clocking used in the discussion heretofore. Note that multiple phase clocking may be used to advantage. Multiple phase clocking has tended to be avoided for global clocking in VLSI due to divergence in phase shifting across long distances. However, local generation of multiple phase clocking by Phase Locked Loops may well be advantageous.

Local generation of Clock*2 signals by Phase Locked Loops may also provide advantage. Local self-timed control structures may also be used advantageously. These and other schemes are not basic to this patent and represent implementation issues which are essentially transparent at the architectural level of this invention.

To implement this, the following elements may be affected. In the Single Precision Multiplier Adder Tree 320 all inputs to the adder tree are registered. The $2^{nd}$ layer of the adder tree is also registered, possibly with part of the zero detection circuit's logic move in front of this register. Zero detection Circuit 330 may also be registered in the middle, approximately after the Zero detect by 12 circuit 334.

While the above is a complete description of specific embodiments of the invention, various modifications, alternative constructions, and equivalents may be used. Therefore, the above description should not be taken as limiting the scope of the invention as defined by the claims.

REFERENCES

1. Ubois, Jeff, "Sun goes Hollywood: 117 SPARCstations render "Toy Story", the first feature-length computer-animated film", SunWorld Online, November 1995, a world wide web electronic magazine to be found at http://www.sun.com/sunworldonline/swol-11-1995/swol-11-pixar.h tml.
2. Fuchs, Henry, U.S. Pat. No. 4,590,465, "Graphics Display System Using Logic-Enhanced Pixel Memory Cells", Filed Feb. 18, 1982, granted May 20, 1986.
3. Andrews, David H., et. al. U.S. Pat. No. 4,646,075, "System and Method for a Data Processing Pipeline", Filed Nov. 3, 1983, granted Feb. 24, 1987.
4. Littlefield, Richard, U.S. Pat. No. 4,949,280, "Parallel Processor-based Raster Graphics System Architecture", Filed May 10, 1988, granted Aug. 14, 1990.
5. Hedley, David, et. al., U.S. Pat. No. 4,953,107, "Video Signal Processing", Filed Aug. 28, 1989, granted Aug. 28, 1990.
6. Westberg, Thomas, et. al., U.S. Pat. No. 5,101,365, "Apparatus for Extending Windows Using Z Buffer Memory", Filed Nov. 7, 1990, granted Mar. 31, 1992.
7. Cawley, Robin, U.S. Pat. No. 5,103,217, "Electronic Image Processing", Filed Nov. 29, 1988, granted Apr. 7, 1992.
8. Liang, Bob, et. al., U.S. Pat. No. 5,182,797, "Multi-Processor Graphics Display System for Displaying Hierarchical Data Structures", Filed May 27, 1992, granted Jan. 26, 1993.
9. Sokai, Toshio, et. al. U.S. Pat. No. 5,594,844, "Three Dimensional View Using Ray Tracing Through Voxels Subdivided Numerically Using Object Based Parameters", Filed Jan. 25, 1994, granted Jan. 14, 1997.
10. Uhlin, Keith, U.S. Pat. No. 5,630,043, "Animated Texture Map Apparatus and Method for 3-D Image Displays", Filed May 11, 1995, granted May 13, 1997.
11. Oppenheim, Alan & Schafer, Ronald, *Digital Signal Processing*, © 1975, Prentice Hall, Englewood Cliffs, N.J.,
12. Oppenheim, Alan & Schafer, Ronald, *Discrete-Time Signal Processing*, © 1989, Prentice Hall, ISBN 0-13-216292-X
13. Barnsley, Michael & Hurd, Lyman, *Fractal Image Compression*, © 1993, AK Peters, Ltd., Wellsley, Mass. 02181, ISBN 1-56881-000-8.
14. Daubechies, Ingrid, *Ten Lectures on Wavelets*, © 1992, Society of Industrial and Applied Mathematics, ISBN 0-89871-274-2.
15. Kaiser, Gerald, *A friendly guide to wavelets*, © 1994, Birkhauser, Boston, ISBN 0-8176-3711-7.
16. Fisher, Yuval (ed.), *Fractal Image Compression*, © 1995 Springer-Verlag, New York, ISBN 0-387-94211-4.
17. McGregor, D. R., et. al. "Faster Fractal Compression", Dr. Dobb's Journal, Jan., 1996, pp 34, etc.
18. Lim, Jae, *Two-Dimensional Signal and Image Processing*, © 1990, Prentice Hall, ISBN 0-13-935322-4.
19. Glassner, Andrew, *Principles of Digital Image Synthesis*, vol. 1 & 2, © 1995 Morgan Kauffman Publishers, Inc., ISBN 1-55860-276-3.
20. Foley, James, et. al., *Computer graphics: principles and practice-* $2^{nd}$ *ed. In C*, © 1996, 1990, Addison-Wesley Publishing Company, ISBN 0-201-84840-6.
21. Watt, Alan, *3D Computer Graphics*, $2^{nd}$ ed., © 1993, Addison-Wesley Publishers, Ltd., ISBN 0-201-63186-5.
22. Watt, Alan & Watt, Mark, *Advanced animation and rendering techniques*, © 1992, ACM Press, ISBN 0-201-54412-1.
23. Prusinkiewicz, Przemyslaw & Lindenayer, Aristid, et. al., *The Algorithmic Beauty of Plants*, © 1990, Springer-Verlag New York, Inc., ISBN 0-387-97297-8.
24. Iwata, Eiji, et. al., "A 2.2GOPS Video DSP th 2-RISC MIMD, 6-PE SIMD Architecture for Real-Time MPEG2 Video Coding/Decoding", 1997 IEEE International Solid-State Circuits Conference, © 1997 IEEE, ISBN 0-7803-3721-2, pages 258–259.
25. Silverbrook, Kia, U.S. Pat. No. 5,590,252, "Video processor system and audio processor system", Filed Apr. 28, 1993, granted Dec. 31, 1996.
26. Uhlin, Keith, U.S. Pat. No. 5,630,043, "Animated Texture map Apparatus and method for 3-D image displays", Filed May 11, 1995, granted May 13, 1997.
27. Sakai, Toshio, et. al., U.S. Pat. No. 5,594,844, "Three Dimensional View Using Ray Tracing Through Voxels Subdivided Numerically using object based parameters", Filed Jan. 25, 1994, granted Jan. 14, 1997.
28. Greene, Edward, et. al., U.S. Pat. No. 5,579,455, "Rendering of 3D Scenes on a display Using Hierarchical Z-Buffer Visibility", Filed Jul. 30, 1993, granted Nov. 26, 1996.
29. Poulton, John, et. al., U.S. Pat. No. 5,481,669, "Architecture and Apparatus for Image Generation Utilizing Enhanced Memory Devices", Filed Feb. 6, 1995, granted Jan. 2, 1996.
30. Patterson, David & Hennessey, John, *Computer Architecture A Quantitative Approach* ($2^{nd}$ ed.), © 1990, 1996, Morgan Kauffman Publishers, Inc., ISBN 1-55860-329-8.
31. Johnson, Mike, *Superscalar Microprocessor Design*, © 1991, P T R Prentice-Hall, Inc., Englewood Cliffs, N.J., ISBN 0-13-875634-1.
32. Murakami, Kazuaki, et. al., "Parallel Processing RAM Chip with 256 Mb DRAM and Quad Processors", 1997 IEEE International Solid-State Circuits Conference, pages 228–229, ISBN 0-7803-3721-2.

33. Aimoto, Yoshiharu, et. al., "A 7.68 GIPs 3.84 GB/s 1W Parallel Image-Processing RAM Integrating a 16 Mb DRAM and 128 Processors", 1996 *TERE International Solid-State Circuits Conference*, pages 372–373, ISBN 0-7803-3136-2.
34. Yao, Yong, "Chromatic's Mpact 2 Boosts 3D: Mpact/3000 Becomes First Media Processor to Ship in Volume", pages 1, 6–10, *Microprocessor Report*, Vol. 10, No. 15, Nov. 18, 1996, © 1996, Microdesign Resources.
35. Shimizu, Tonu, et. al., "A Multimedia 32 b RISC Microprocessor with 16 Mb DRAM", 1996 *IEEE International Solid-State Circuits Conference*, pages 216–217, ISBN 0-7803-3136-2.
36. Glaskowsky, Peter, "Fujitsu Aims Media Processor at DVD: MMA Combines Long-Instruction-Word Core, Integrated Peripherals", pages 11–13, *Microprocessor Report*, Vol. 10, No. 15, Nov. 18, 1996, © 1996, Microdesign Resources.
37. "Samsung announces Multimedia Signal Processor", *The John Peddie Associates PC Graphics Report*, Aug. 20, 1996, © 1996, John Peddie Associates, Tiburon, Calif. 94920, pages 1153–1156.
38. Yao, Yong, "Samsung Launches Media Processor: MSP is Designed for Microsoft's New 3D-Software Architecture", pages 1, 6–9, *Microprocessor Report*, Vol. 10, No. 11, Aug. 26, 1996, © 1996, Microdesign Resources.
39. "Chromatic rolls out Mpact", *The John Peddie Associates PC Graphics Report*, Aug. 27, 1996, © 1996, John Peddie Associates, Tiburon, Calif. 94920, pages 1182–1183.
40. Romney, Gordon, et. al. U.S. Pat. No. 3,621,214, "Electronically Generated Perspective", Filed Nov. 13, 1968, granted Nov. 16, 1971.
41. Gove, Robert, U.S. Pat. No. 5,410,649, "Imaging 10 Computer System and Network", Filed Jun. 29, 1992, granted Apr. 25, 1995.
42. Gove, Robert, et. al., U.S. Pat. No. 5,522,083, "Reconfigurable Multi-Processor Operating in SIMD Mode with one processor fetching instructions for use by remaining processors", Filed Jun. 22, 1994, granted May 28, 1996.
43. "TMX320C6201 Digital Signal Processor: Product Preview", SPRS051.pdf—January, 1997, © 1997 Texas Instruments, available from the Texas Instruments Website http://www.ti.com.
44. Weinreb, Daniel and Moon, David, *Flavors: Message Passing in the Lisp Machine*, AI Memo 602, November, 1980, M.I.T. Artificial Intelligence Lab.
45. Dally, William, et. al., *Message-Driven Processor Architecture, Version* 11, AI memo 1069, August 1988, M.I.T. Artificial Intelligence Lab.
46. Cray, Seymour, U.S. Pat. No. 4,128,880, Filed Jun. 30, 1976, granted Dec. 5, 1978.
47. Beard, Douglas, et. al., U.S. Pat. No. 5,544,337, "Vector Processor having Registers for Control by Vector Registers", Filed Jun. 7, 1995, granted Aug. 6, 1996.
48. Yoshinaga, Toru and Shinjo, Naoki, U.S. Pat. No. 5,598,574, "Vector Processing Device", Filed Mar. 18, 1996, granted Jan. 28, 1997.
49. Cray, Seymour, U.S. Pat. No. 3,833,889, "Multi-mode Data Processing System", Filed Mar. 8, 1973, granted Sep. 3, 1974.
50. Porter, John, et. al., U.S. Pat. No. 4,589,067, "Full Floating Point Vector Processor with Dynamically Configurable Multifunction Pipelined ALU", filed May 27, 1983, granted May 13, 1986.
51. Ellis, James, et. al., U.S. Pat. No. 5,418,973, "Digital Computer System with Cache Controller Coordinating both Vector and Scalar Operations", filed Jun. 22, 1992, granted May 23, 1995.
52. Omoda, Koichiro, et. al. U.S. Pat. No. 4,651,274, "Vector Data Processor", Filed Mar. 28, 1984, granted Mar. 17, 1987.
53. Gallup, Michael, et. al., U.S. Pat. No. 5,600,846, "Data processing system and method thereof", Filed Feb. 17, 1995, granted Feb. 4, 1997.
54. Prince, Betty, *Semiconductor Memories: A Hanhook of Design, Manufacture and Application*, $2^{nd}$ ed., © 1983, 1991 John Wiley & Sons, Ltd., ISBN 0-471-94295-2.
55. *Product Description: The MTPS16 Application Specific Extension*, vl. 1, found through the Silicon Graphics Incorporated website on Jul. 24, 1997, http://www.sgi.com/MIPS/mips16.pdf.
56. *An Introduction to Thumb™* v. 2.0, Issued March, 1995, © Advanced RISC Machines Ltd. (ARM) 1995.
57. "Volume 1 Editorial", *Image Communication Journal: Special Issue on MPEG-4*, downloaded the week of Jul. 17, 1997, from http://drogo/cselt.stet.it/ufv/leonardo/icjfiles/mepg-4_si/pap er0.htm.
58. Koenen, Rob, Pereira, F., and Chiariglione, L. "MPEG4: Context and Objectives", *Image Communication Journal: Special Issue on MPEG-4*, downloaded the week of Jul. 17, 1997, from http://drogo/cselt.stet.it/ufv/leonardo/icjfiles/mepg-4_si/pap er1.htm.
59. Contin, L, et. al. "Tests on MPEG-4 Audio Codec Proposals", *Image Communication Journal: Special Issue on MPEG-4*, downloaded the week of Jul. 17, 1997, from http://drogo/cselt.stet.it/ufv/leonardo/icjfiles/mepg-4_si/pap er3.htm.
60. Osterman, Jörn, "Methodologies Used for Evaluation of Video Tools and Algorithms in MPEG-4", *Image Communication Journal: Special Issue on MPEG-4*, downloaded the week of Jul. 17, 1997, from http://drogo/cselt.stet.it/ufv/leonardo/icjfiles/mepg-4_si/pap er4.htm.
61. Ebrahimi, Touradj, "MPEG-4 Video Verification Model: A video encoding/decoding algorithm based on content representation", *Image Communication Journal: Special Issue on MPEG-4*, downloaded the week of Jul. 17, 1997, from http://drogo/cselt.stet.it/ufv/leonardo/icjfiles/mepg-4_si/pap er5.htm.
62. Avaro, 0. et. al. "The MPEG-4 Systems and Description Languages: A way ahead in Audio Visual Information Representation", *Image Communication Journal: Special Issue on MPEG-4*, downloaded the week of Jul. 17, 1997, from http://drogo/cselt.stet.it/ufv/leonardo/icjfiles/mepg-4_si/pap er06.htm.
63. Doenges, P. et. al. "MPEG-4: Audio/Video & Synthetic Graphics/Audio for Mixed Media", *Image Communication Journal: Special Issue on MPEG-4*, downloaded the week of Jul. 17, 1997, from http://drogo/cselt.stet.it/ufv/leonardo/icjfiles/mepg-4_si/pap er7.htm.
64. Gosling, James, Joy, Bill and Steele, Guy, *The Java™ Language Specification*, © 1996 Sun Microsystems, Inc. published by Addison-Wesley, ISBN 0-201-63451-1.
65. Arnold, Ken and Gosling, James, *The Java™ Programming Language*, © 1996 Sun Microsystems Inc. published by Addison-Wesley, ISBN 0-201-63455-4.
66. *Intel, Accelerated Graphics Port Interface Specification*, rev. 1.0, Intel Corporation, Jul. 31, 1996.
67. *Universal Serial Bus Specification*, rev. 1.0, by Compaq, Digital Equipment Corporation, IBM PC Company, Intel, Microsoft, NEC, Northern Telecom, Jan. 15, 1996.
68. Solari, Edward and Willse, George, *PCI Hardware and Software, 3rd Edition*, © 1994, 1995, 1996, Published by Annabooks, San Diego, Calif, ISBN 0-92392-32-9, Fifth printing, January, 1996.
69. Shanley, Tom, Anderson, Don, *PCI System Architecture, 3rd Edition*, © 1995 Mindshare, Inc., ISBN 0-201-40993-3, First Printing, February 1995.

70. Papaichalis, Panos and So, John, "Implementation of Fast Fourier Transform Algorithms with the TMS32020", pages 84–85, *Digital Signal Processing Applications with the TMS320 Family*, © 1986 Texas Instruments, Incorporated.

71. Ohtomo, Ishizuka, Kashimura, Nakajima and Hira, "A 32-bit Floating Point Digital Signal Processor for Graphics Application", NEC Research and Development, No. 99, 1990, pages 47–52.

72. Takagi, Yasuura and Yajima, "High-Speed VLSI Multiplication Algorithms with a Redundant Binary Addition Tree", IEEE Transactions on Computers, Vol. C-34, 1985, pp 789–796.

73. Hammer, R., Hocks, M., Kulisch, U., and Ratz, D., "Chapter 3: Mathematical Preliminaries", *Numerical Tool box for Verified Computing To Basic Numerical Problems, Theory, Algorithms, and Pascal-XSC Programs*, Springer-Verlag, Berlin, ISBN 3-540-57118-3.

74. "IEEE Standard for Binary Floating Point Arithmetic", ANSI/IEEE Std 754-1985, Institute for Electrical and Electronics Engineers, Inc., 345 East $47^{th}$ Street, New York, N.Y. 10017, USA.

75. Matula, David W., "Design of a highly Parallel IEEE Standard Floating Point Arithmetic Unit", Extended Abstract.

What is claimed is:

1. A device comprising:
    a shared operand generator, the shared operand generator receiving a first operand and outputting a result that is a fixed function of the first operand; and
    an arithmetic circuit comprising:
        a plurality of multiply circuits, each of the plurality of multiply circuits having circuitry to calculate partial products of the first operand and a second operand using at least one of a set including the first operand and the result of the shared operand generator, and circuitry to selectively calculate a sum of the partial products and a third operand and produce an arithmetic result; and
        a most significant zero detector for determining the bit position in the arithmetic circuit result of the most significant zero.

2. The device of claim 1 wherein the result of the shared operand generator is stored in a register.

3. The device of claim 2 wherein the first operand is stored in a register.

4. The device of claim 1 wherein the third operand is stored in a register.

5. The device of claim 1 wherein the fixed function is an arithmetic function.

6. The device of claim 1 wherein the fixed function is a multiplication by three.

7. The device of claim 1 wherein the second input of each of the plurality of multiply circuits is coupled to a different operand.

8. The device of claim 1 wherein the second inputs of each of the plurality of multiply circuits are not coupled to the same operand.

9. The device of claim 1 further comprising a plurality of bit multipliers in the arithmetic circuit, wherein each of the plurality of bit multipliers multiplies a different bit of the second operand with the first operand to produce the partial products.

10. The device of claim 9 wherein the second operand comprises a collection of subsets of digits which taken as a whole represent the value of the second operand.

11. The device of claim 10 wherein the second operand comprises subsets comprising 3 distinct digits and one shared digit in each subset.

12. The device of claim 9 further comprising an adder tree for adding the partial products and the third input.

13. The device of claim 1 further comprising an output formatter for formatting the arithmetic circuit result.

14. The device of claim 1 wherein the first and second operands are floating point operands.

15. A device comprising:
    a shared operand generator, the shared operand generator receiving a first operand and outputting a result that is a fixed function of the first operand; and
    an arithmetic circuit comprising:
        a plurality of multiply circuits, each of the plurality of multiply circuits having circuitry to calculate partial products of the first operand and a second operand using at least one of a set including the first operand and the result of the shared operand generator, and circuitry to selectively calculate a sum of the partial products and a third operand and produce an arithmetic result;
        a most significant zero detector for determining the bit position in the arithmetic circuit result of the most significant zero; and
        wherein the most significant zero detector further comprises a first stage with a plurality of zero bit detectors each operating on a subset of the sum, a second stage with a plurality of zero bit detectors operating on the results of the first stage, and a third stage with a zero bit detector operating on the results of the second stage.

16. A device for performing multiply/accumulate operations based upon a multiplication algorithm utilizing successive small bit multiply operations, comprising:
    a shared operand generator for receiving a first operand and outputting a result that is a fixed function of the first operand; and
    an arithmetic circuit comprising:
        a plurality of small bit multipliers, wherein each of the plurality of small bit multipliers operates to perform the multiplication algorithm on a first input and a bit of a second input to calculate a plurality of partial products, wherein the first input is one of a set including the first operand and the result of the shared operand generator;
        an adder tree for adding the partial products and a third input to calculate a multiply/accumulate result; and
        a most significant zero detector for determining the bit position in the arithmetic circuit result of the most significant zero.

17. The device of claim 16 wherein the adder tree comprises a first local carry adder for adding a first subset of the plurality of partial products, a second local carry adder for adding a second subset of the plurality of partial products, and a third local carry adder for adding the results of the first and second local carry adders.

18. The device of claim 17 further comprising a fourth local carry adder for adding a third subset of the plurality of partial products, wherein the third local carry adder adds the results of the first, second, and fourth local carry adders.

19. The device of claim 18 further comprising alignment circuitry for aligning the results of the fourth local carry adder.

20. The device of claim 17 wherein the second carry adder adds the third input with the second subset of the plurality of partial products.

21. The device of claim 17 further comprising alignment circuitry for aligning the results of the third local carry adder.

* * * * *